US008957906B2

(12) United States Patent
Munshi et al.

(10) Patent No.: US 8,957,906 B2
(45) Date of Patent: *Feb. 17, 2015

(54) SUBBUFFER OBJECTS

(71) Applicant: Apple Inc., Cupertino, CA (US)

(72) Inventors: Aaftab A. Munshi, Los Gatos, CA (US); Ian R. Ollmann, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/254,801

(22) Filed: Apr. 16, 2014

(65) Prior Publication Data

US 2014/0313214 A1 Oct. 23, 2014

Related U.S. Application Data

(63) Continuation of application No. 12/892,834, filed on Sep. 28, 2010, now Pat. No. 8,723,877.

(60) Provisional application No. 61/346,866, filed on May 20, 2010.

(51) Int. Cl.
*G06F 15/167* (2006.01)
*G06T 1/60* (2006.01)

(52) U.S. Cl.
CPC ........................................ *G06T 1/60* (2013.01)
USPC ........................... 345/541; 345/502; 345/537

(58) Field of Classification Search
CPC ............ G06T 1/20; G06T 1/60; G06T 15/005
USPC .................................. 345/502, 533, 541, 542
See application file for complete search history.

(56) References Cited

U.S. PATENT DOCUMENTS 6,493,773 B1 12/2002 Daniel et al.
7,634,776 B2 12/2009 Parameswaran et al.
(Continued)

FOREIGN PATENT DOCUMENTS

EP   1 450 257 A1   8/2004
EP   2 012 533 A1   4/2007
(Continued)

OTHER PUBLICATIONS

Ruiz, Noel, "A Framework for Integrating Heterogeneous, Small-Scale Devices into Computational Grids and Clusters", 2003, UCLA, 81 pgs.
(Continued)

*Primary Examiner* — Hau Nguyen
*Assistant Examiner* — Ryan M Gray
(74) *Attorney, Agent, or Firm* — Blakely, Sokoloff, Taylor & Zafman LLP

(57) ABSTRACT

A method and an apparatus for a parallel computing program using subbuffers to perform a data processing task in parallel among heterogeneous compute units are described. The compute units can include a heterogeneous mix of central processing units (CPUs) and graphic processing units (GPUs). A system creates a subbuffer from a parent buffer for each of a plurality of heterogeneous compute units. If a subbuffer is not associated with the same compute unit as the parent buffer, the system copies data from the subbuffer to memory of that compute unit. The system further tracks updates to the data and transfers those updates back to the subbuffer.

19 Claims, 15 Drawing Sheets

(56) References Cited

U.S. PATENT DOCUMENTS

| | | | |
|---|---|---|---|
| 7,701,459 B1 | 4/2010 | Mrazek et al. | |
| 7,921,151 B2 | 4/2011 | Aguilar et al. | |
| 8,095,735 B2 * | 1/2012 | Brewer et al. | 711/127 |
| 8,108,845 B2 * | 1/2012 | Little et al. | 717/149 |
| 8,468,532 B2 * | 6/2013 | Aguilar et al. | 718/103 |
| 2004/0187094 A1 | 9/2004 | Gil et al. | |
| 2006/0251070 A1 | 11/2006 | Yamazaki et al. | |
| 2007/0179927 A1 | 8/2007 | Vaidyanathan et al. | |
| 2007/0255929 A1 | 11/2007 | Kasahara et al. | |
| 2008/0028179 A1 | 1/2008 | Mannarswamy et al. | |
| 2008/0109795 A1 | 5/2008 | Buck et al. | |
| 2008/0147993 A1 * | 6/2008 | Kaneko | 711/147 |
| 2008/0276064 A1 | 11/2008 | Munshi et al. | |
| 2008/0278509 A1 | 11/2008 | Washizu et al. | |
| 2009/0148741 A1 | 6/2009 | Imanishi et al. | |
| 2009/0319992 A1 | 12/2009 | Duffy et al. | |
| 2010/0118041 A1 | 5/2010 | Chen et al. | |
| 2010/0174876 A1 | 7/2010 | Kasahara et al. | |
| 2011/0157195 A1 * | 6/2011 | Sprangle et al. | 345/522 |

FOREIGN PATENT DOCUMENTS

| | | |
|---|---|---|
| EP | 1956484 A1 | 8/2008 |
| JP | 2006-286002 | 10/2006 |
| JP | 2006-293768 | 10/2006 |
| JP | 2007-172456 | 7/2007 |
| JP | 2008-217134 | 9/2008 |
| KR | 10-2007-0061795 | 6/2007 |
| WO | WO 01/48620 A | 7/2001 |
| WO | WO 2008/127622 A2 | 10/2008 |
| WO | WO 2009/147741 A1 | 12/2009 |

OTHER PUBLICATIONS

Berg, D., et al., "Data Flow Manager for DART", Fermi National Accelerator Laboratory, Apr. 1994, San Francisco, CA, 5 pgs.

Aaftab Munshi, The OpenCL Specification, Version: 1.1, Document Revision: 28, Khronos OpenCL Working Group, 377 pgs., Sep. 28, 2010.

Aaftab Munshi, Khronos Group, "The Open CL Specification", Version 1.0, Document Revision: 48, Khrono OpenCL Working Group, Oct. 6, 2009, 125 pages.

PCT International Search Report and Written Opinion of the International Searching Authority for PCT/US2011/033282 filed Apr. 20, 2011.

PCT International Preliminary Report on Patentability for PCT/US2011/033282 mailed Nov. 29, 2012.

PCT International Search Report and Written Opinion for PCT International Appln No. PCT/US2011/033282 mailed Nov. 20, 2012. (7 pages).

Tomomi, Sato et al., "Implementation Method of Communication Protocols Using Processor-per-layer Parallel Processing for Shared Memory Multiprocessor Systems", Information Processing Society of Japan, Japan, Sep. 15, 1998, vol. 39, No. 9, pp. 2727-2740.

* cited by examiner

1300

```
const sampler_t sampler = { CL_ADDRESS_CLAMP_TO_EDGE,
                            CL_FILTER_NEAREST,
                            CL_FALSE
};
         ___ 1305                          ___ 1301
__kernel void image_filter (int n, int m,
                __constant float *filter_weights,          ___ 1303
                __global __rd image2d_t src_image,
                __global __wr image2d_t dst_image)
{
        int i, j;
        int indx = 0;
        int tid_x = get_global_thread_id(0);
        int tid_y = get_global_thread_id(1);
        float4 filter_result = make_float4(0.0f, 0.0f, 0.0f, 0.0f);
        for (i=-m/2; i<(m+1)/2; i++)
        {
                for (j=-n/2; j<(n+1)/2; j++)
                {
                        float w = filter_weights[indx++];
                        if (w != 0.0f)
                        {
                                filter_result += w * read_imagef(src_image, sampler,
                                make_int2(tid_x + j, tid_y + i));
                        }
                }
        }
        write_imagef(dst_image, make_int2(tid_x, tid_y), filter_result);
}
```

```
void
delete_memobjs(cl_mem *memobjs, int n)
{
        int i;
        for (i=0; i<n; i++) clReleaseMemObject(memobjs[i]);
} int
exec_image_filter_kernel(int filter_w, int filter_h, const float *filter_weights, const cl_image_format *image_format_desc,
                    const char *image_filter_src, void *src_image, void *dst_image);
{
        size_t args_size[] = { sizeof(int), sizeof(int), sizeof(cl_mem), sizeof(cl_mem), sizeof(cl_mem),
};
        void                *args_value[5];
        int                 args_indices[5] = { 0, 1, 2, 3, 4 };
        int                 num_devices;
        cl_                 device device;
        cl_context          context;
        cl_program          program;
        cl_kernel           kernel;
        cl_mem              memobjs[3];
        cl_event            events[3];
        cl_mem_flags        flags;
        cl_context_property context_properties[3];
        int                 thread_dim[2];
        int                 err;
```

1401 →
```
// get the GPU compute device and create a compute context
        clGetComputeDevices(CL_DEVICE_GPU, 1, &device, &num_devices);
        context_properties[0] = CL_CONTEXT_EXEC_MODE_ASYNC;
        context_properties[1] = true;
        context_properties[2] = NULL;
        context = clCreateContext(context_properties, device);
        if (context == (cl_context)0)     return -1;
```

1403a →
```
// allocate the input and output image memory objects
        flags = CL_MEM_ALLOC_GLOBAL_POOL | CL_MEM_READ_ONLY;
        memobjs[0] = clCreateImage2D(device, flags,
        image_format_desc, w, h, NULL);
        if (images [0] == (cl_mem)0)
        {
                clReleaseContext(context);
                return -1;
        }
        flags = CL_MEM_ALLOC_GLOBAL_POOL | CL_MEM_WRITE_ONLY;
        memobjs[1] = clCreateImage2D(device, flags,
        image_format_desc, w, h, NULL);
        if (images[1] == (cl_mem)0)
        {
                delete_memobjs(memobjs, 1);
                clReleaseContext(context);
                return -1;
        }
```

```
// load the input image
        err = clWriteImage(context, memobjs[0], true, 0, 0, 0, w, h, 1, NULL, src_image, &events[0]);
        if (err != CL_SUCCESS)
        {
                delete_memobjs(memobjs, 2);
                clReleaseContext(context);
                return -1;
        }
```

```
// allocate an array memory object to load the filter weights
        flags = CL_MEM_ALLOC_CONSTANT_POOL;
        memobjs[2] = clCreateArray (device, flags,
        sizeof(float), n * m, NULL);
        if (memobjs[2] == (cl_mem)0)
        {
                delete_memobjs(memobjs, 2);
                clReleaseContext(context);
                return -1;
        }

// load the filter weights into filter_array
        err = clWriteArray(context, memobjs[2], true, (n * m * sizeof(float)),
                        filter_weights, &events[1]);
        if (err != CL_SUCCESS)
        {
                delete_memobjs(memobjs, 3);
                clReleaseContext(context);
                return -1;
        }

// create the compute program
        program = clCreateProgram(device);
        if (program == (cl_program)0)
        {
                delete_memobjs(memobjs, 3);
                clReleaseContext(context);
                return -1;
        }

// load the compute program source
        err = clLoadProgramSource(program, 1, &image_filter_src, NULL);
        if (err != CL_SUCCESS)
        {
                delete_memobjs(memobjs, 3);
                clReleaseProgram(program);
                clReleaseContext(context);
                return -1;
        }

// build the compute kernel executable
        err = clBuildProgramExecutable(program, false, NULL, NULL);
        if (err != CL_SUCCESS)
        {
                delete_memobjs(memobjs, 3);
                clReleaseProgram(program);
                clReleaseContext(context);
                return -1;
        }

// create the compute kernel
        kernel = clCreateKernel(program, "image_filter");
        if (kernel == (cl_kernel)0)
        {
                delete_memobjs(memobjs, 3);
                clReleaseProgram(program);
                clReleaseContext(context);
                return -1;
        }
```

```
// create kernel args object and set arg values.
// set the args values
        args_value[0] = (void *)&filter_w;
        args_value[1] = (void *)&filter_h;
        args_value[2] = (void *)memobjs[2];
        args_value[3] = (void *)memobjs[0];
        args_value[4] = (void *)memobjs[1];
1414    err = clSetKernelArgs(context, kernel, 5, args_indices, args_value, args_size);
        if (err != CL_SUCCESS)
        {
                delete_memobjs(memobjs, 3);
                clReleaseKernel(kernel);
                clReleaseProgram(program);
                clReleaseContext(context);
                return -1;
        }

// set thread dimensions
        thread_dim[0] = w; thread_dim[1] = h;

1415 // execute kernel
     // make sure writes to images have completed
     // before executing kernel
        err = clExecuteKernel(context, kernel, NULL, thread_dim, NULL, 2, events, 2, events[2]);
        if (err != CL_SUCCESS)
        {
        delete_memobjs(memobjs, 3);
        clReleaseKernel(kernel);
        clReleaseProgram(program);
        clReleaseContext(context);
        return -1;
1417    }

// synchronous mode - wait for kernel execution to complete
        err = clGetEventStatus(events[2], CL_EVENT_WAIT_FOR_COMPLETION, NULL);
        if (err != CL_SUCCESS)
        {
                delete_memobjs(memobjs, 3);
                clReleaseKernel(kernel);
                clReleaseProgram(program);
                clReleaseContext(context);
                return -1;
1419    }

// read output image
        err = clReadImage(context, memobjs[1], false, 0, 0, 0, w, h, 1, dst_image, NULL);
        if (err != CL_SUCCESS)
        {
                delete_memobjs(memobjs, 3);
                clReleaseKernel(kernel);
                clReleaseProgram(program);
                clReleaseContext(context);
                return -1;
1421    }

// release kernel, program, and memory objects
        delete_memobjs(memobjs, 3);
        clReleaseKernel(kernel);
        clReleaseProgram(program);
        clReleaseContext(context);
        return 0; // success...
}
```

Fig. 14C

SUBBUFFER OBJECTS

RELATED APPLICATIONS

This application is a continuation of co-pending U.S. application Ser. No. 12/892,834 filed on Sep. 28, 2010 which claims the benefit of U.S. Provisional Patent Application No. 61/346,866, filed on May 20, 2010, which application is incorporated herein by reference.

FIELD OF INVENTION

The present invention relates generally to data parallel computing. More particularly, this invention relates to managing subbuffer objects associated with a buffer in a heterogeneous multi-compute unit environment.

BACKGROUND

As GPUs continue to evolve into high performance parallel computing devices, more and more applications are written to perform data parallel computations in GPUs similar to general purpose computing devices. Today, these applications are designed to run on specific GPUs using vendor specific interfaces. Thus, these applications are not able to leverage processing resources of CPUs even when both GPUs and CPUs are available in a data processing system. Nor can processing resources be leveraged across GPUs from different vendors where such an application is running.

However, as more and more CPUs embrace multiple cores to perform data parallel computations, more and more processing tasks can be supported by either CPUs and/or GPUs whichever are available. Traditionally, GPUs and CPUs are configured through separate programming environments that are not compatible with each other. Most GPUs require dedicated programs that are vendor specific. As a result, it is very difficult for an application to leverage processing resources of both CPUs and GPUs, for example, leveraging processing resources of GPUs with data para computing capabilities together with multi-core CPUs.

In addition, CPUs and GPUs use separate memory address spaces. The memory buffer needs to be allocated and copied in GPU memory for the GPU to process data. If an application wants the CPU and one or more GPUs to operate on regions of a data buffer, the application needs to manage allocation and copying of data from appropriate regions of the buffer that is to be shared between CPU and GPU or across GPUs. Therefore, there is a need in modern data processing systems to have a heterogeneous mix of CPUs and GPUs sharing a buffer.

SUMMARY OF THE DESCRIPTION

A method and an apparatus for a parallel computing program using subbuffers to perform a data processing task in parallel among heterogeneous compute units are described. The compute units can include a heterogeneous mix of central processing units (CPUs) and graphic processing units (GPUs). A system creates a subbuffer from a parent buffer for each of a plurality of heterogeneous compute units. If a subbuffer is not associated with the same compute unit as the parent buffer, the system copies data from the subbuffer to memory of that compute unit. The system further tracks updates to the data and transfers those updates back to the subbuffer.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 13 is sample source code illustrating an example of a compute kernel source for a compute kernel executable to be executed in a plurality of physical computing devices;

FIGS. 14A-14C include a sample source code illustrating an example to configure a logical computing device for executing one of a plurality of executables in a plurality of physical computing devices by calling APIs;

DETAILED DESCRIPTION

Figure 1:
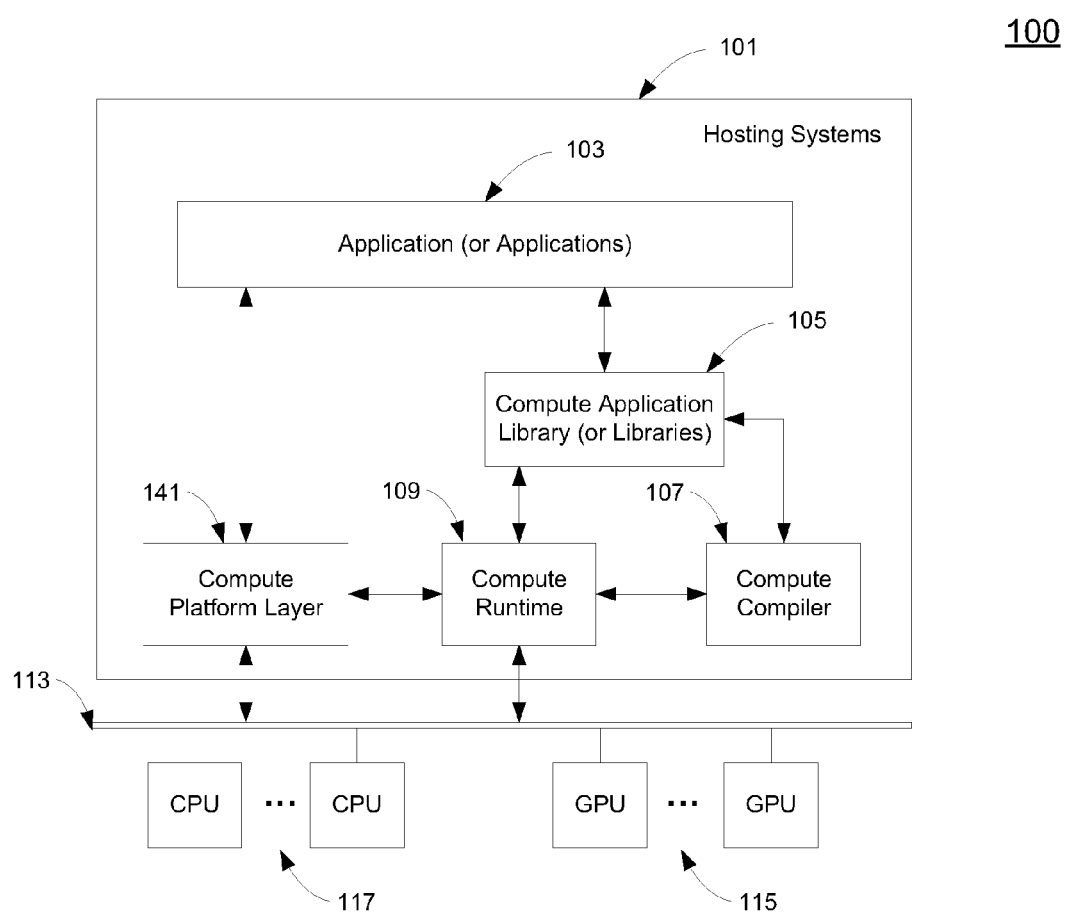
FIG. 1 is a block diagram illustrating one embodiment of a system to configure computing devices including CPUs and/or GPUs to perform data parallel computing for applications.

A method and an apparatus for data parallel computing on multiple processors using subbuffers created front a parent buffer is described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

A Graphics Processing Unit (GPU) may be a dedicated graphics processor implementing highly efficient graphics operations, such as 2D, 3D graphics operation and/or digital video related functions. A GPU may include special (programmable) hardware to perform graphics operations, e.g. blitter operations, texture mapping, polygon rendering, pixel shading and vertex shading. GPUs are known to fetch data from a frame buffer and to blend pixels together to render an image back into the frame buffer for display. GPUs may also control the frame buffer and allow the frame buffer to be used to refresh a display, e.g. a CRT or LCD display Either a CRT or an LCD display is a short persistence display that requires refresh at a rate of at least 20 Hz (e.g. every ⅟30 of a second, the display is refreshed with data from a frame buffer). Usually, GPUs may take graphics processing tasks from CPUs coupled with the GPUs to output raster graphics images to display devices through display controllers. References in the specification to "GPU" may be a graphics processor or a programmable graphics processor as described in "Method and Apparatus for Multithreaded Processing of Data In a Programmable Graphics Processor", Lindholdm et al., U.S. Pat. No. 7,015,913, and "Method for Deinterlacing Interlaced Video by A Graphics Processor", Swan et al., U.S. Pat. No. 6,970,206, which are hereby incorporated by reference.

In one embodiment, a plurality of different types of processors, such as CPUs or GPUs may perform data parallel processing tasks for one or more applications concurrently to increase the usage efficiency of available processing resources in a data processing system. Processing resources of a data processing system may be based on a plurality of physical computing devices, such as CPUs or GPUs. A physical computing device may include one or more compute units. In one embodiment, data parallel processing tasks (or data parallel tasks) may be delegated to a plurality types of processors, for example, CPUs or GPUs capable of performing the tasks. A data parallel task may require certain specific processing capabilities from a processor. Processing capabilities may be, for example, dedicated texturing hardware support, double precision floating point arithmetic, dedicated local memory, stream data cache, or synchronization primitives. Separate types of processors may provide different yet overlapping groups of processing capabilities. For example, both CPU and GPU may be capable of performing double precision floating point computation. In one embodiment, an application is capable of leveraging either a CPU or a GPU, whichever is available, to perform a data parallel processing task.

In another embodiment, the system can allocate a parent buffer and further subdivide this parent buffer into multiple subbuffers. If the compute unit for the subbuffer is the same compute unit as the one associated with the parent buffer, that compute unit accesses the subbuffer data using pointers. If the compute unit for the subbuffer is different than the compute unit for the parent buffer, the system copies the data from the subbuffer to memory local to the compute unit for the subbuffer. Furthermore, the system tracks updates to the copied data and transfers the updated data back to the subbuffer.

FIG. 1 is a block diagram illustrating one embodiment of a system 100 to configure computing devices including CPUs and/or GPUs to perform data parallel computing for applications. System 100 may implement a parallel computing architecture. In one embodiment, system 100 may be a graphics system including one or more host processors coupled with one or more central processors 117 and one or more other processors such as media processors 115 through a data bus 113. The plurality of host processors may be networked together in hosting systems 101. The plurality of central processors 117 may include multi-core CPUs from different vendors. A compute processor or compute unit, such as CPU or GPU, may be associated a group of capabilities. For example, a media processor may be a GPU with dedicated texture rendering hardware. Another media processor may be a GPU supporting both dedicated texture rendering hardware and double precision floating point arithmetic. Multiple GPUs may be connected together for Scalable Link Interface (SLI) or CrossFire configurations.

In one embodiment, the hosting systems 101 may support a software stack. The software stack can include software stack components such as applications 103, a compute platform layer 141, e.g. an OpenCL (Open Computing Language) platform, a compute runtime layer 109, a compute compiler 107 and compute application libraries 105. An application 103 may interface with other stack components through API calls. One or more threads may be running concurrently for the application 103 in the hosting systems 101. The compute platform layer 141 may maintain a data structure, or a computing device data structure, storing processing capabilities for each attached physical computing device. In one embodiment, an application may retrieve information about available processing resources of the hosting systems 101 through the compute platform layer 141. An application may select and specify capability requirements for performing a processing task through the compute platform layer 141. Accordingly, the compute platform layer 141 may determine a configuration for physical computing devices to allocate and initialize processing resources from the attached CPUs 117 and/or GPUs 115 for the processing task. In one embodiment, the compute platform layer 141 may generate one or more logical computing devices for the application corresponding to one or more actual physical computing devices configured.

The compute runtime layer 109 may manage the execution of a processing task according to the configured processing resources for an application 103, for example, based on one or more logical computing devices. In one embodiment, executing a processing task may include creating a compute program object representing the processing task and allocating memory resources, e.g. for holding executables, input/output data etc. An executable loaded for a compute program object may be a compute program executable. A compute program executable may be included in a compute program object to be executed in a compute processor or a compute unit, such as a CPU or a CPU. The compute runtime layer 109 may interact with the allocated physical devices to carry out the actual execution of the processing task. In one embodiment, the compute runtime layer 109 may coordinate executing multiple processing tasks from different applications according to run time states of each processor, such as CPU or CPU configured for the processing tasks. The compute runtime layer 109 may select, based on the run time states, one or more processors from the physical computing devices configured to perform the processing tasks. Performing a processing task may include executing multiple threads of one or more executables in a plurality of physical computing devices concurrently. In one embodiment, the compute runtime layer 109 may track the status of each executed processing task by monitoring the run time execution status of each processor.

The runtime layer may load one or more executables as compute program executables corresponding to a processing task from the application 103. In one embodiment, the compute runtime layer 109 automatically loads additional executables required to perform a processing task from the compute application library 105. The compute runtime layer 109 may load both an executable and its corresponding source program for a compute program object from the application 103 or the compute application library 105. A source program for a compute program object may be a compute program source. A plurality of executables based on a single compute program source may be loaded according to a logical computing device configured to include multiple types and/or different versions of physical computing devices. In one embodiment, the compute runtime layer 109 may activate the compute compiler 107 to online compile a loaded source program into an executable optimized for a target processor, e.g. a CPU or a GPU, configured to execute the executable.

An online compiled executable may be stored for future invocation in addition to existing executables according to a corresponding source program. In addition, the executables may be compiled offline and loaded to the compute runtime 109 using API calls. The compute application library 105 and/or application 103 may load an associated executable in response to library API requests from an application. Newly compiled executables may be dynamically updated for the compute application library 105 or for the application 103. In one embodiment, the compute runtime 109 may replace an existing compute program executable in an application by a new executable online compiled through the compute compiler 107 for a newly upgraded version of computing device. The compute runtime 109 may insert a new executable online compiled to update the compute application library 105. In one embodiment, the compute runtime 109 may invoke the compute compiler 107 when loading an executable for a processing task. In another embodiment, the compute compiler 107 may be invoked offline to build executables for the compute application library 105. The compute compiler 107 may compile and link a compute kernel program to generate a compute program executable. In one embodiment, the compute application library 105 may include a plurality of functions to support, for example, development toolkits and/or image processing. Each library function may correspond to a compute program source and one or more compute program executables stored in the compute application library 105 for a plurality of physical computing devices.

Figure 2:
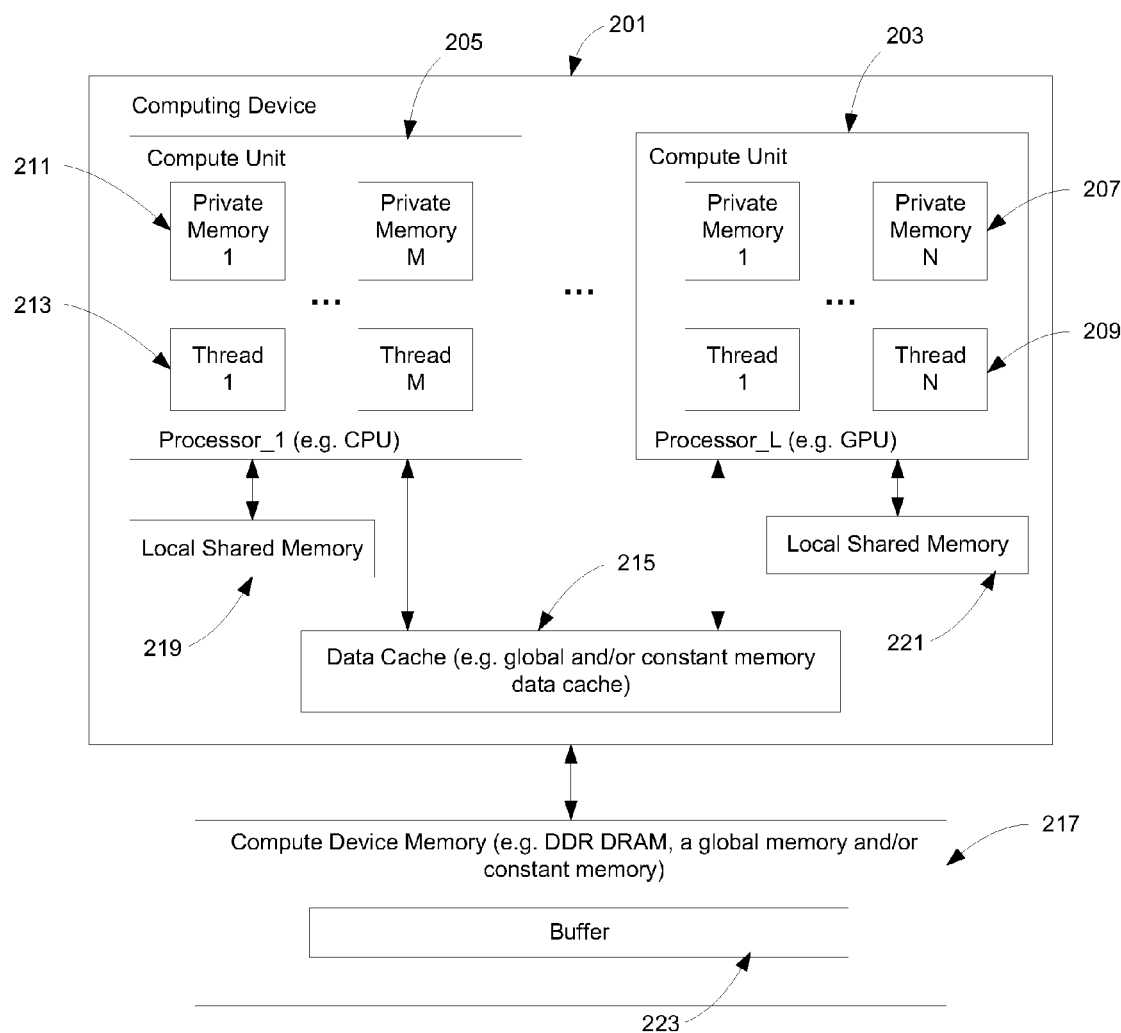
FIG. 2 is a block diagram illustrating an example of a computing device with multiple compute processors operating in parallel to execute multiple threads concurrently.

FIG. 2 is a block diagram illustrating an example of a computing device with multiple compute processors (e.g. compute units) operating in parallel to execute multiple threads concurrently. Each compute processor may execute a plurality of threads in parallel (or concurrently). Threads that can be executed in parallel in a compute processor or compute unit may be referred to as a thread group. A computing device could have multiple thread groups that can be executed in parallel. For example, M threads are shown to execute as a thread group in computing device 205. Multiple thread groups, e.g. thread 1 of compute processor_1 205 and thread N of compute processor_L 203, may execute in parallel across separate compute processors on one computing device or across multiple computing devices. A plurality of thread groups across multiple compute processors may execute a compute program executable in parallel. More than one compute processors may be based on a single chip, such as an ASIC (Application Specific Integrated Circuit) device. In one embodiment, multiple threads from an application may be executed concurrently in more than one compute processors across multiple chips.

A computing device may include one or more compute processors or compute units such as Processor_1 205 and Processor_L 203. A local memory may be coupled with a compute processor. Local memory, shared among threads in a single thread group running in a compute processor, may be supported by the local memory coupled with the compute processor. Multiple threads from across different thread groups, such as thread 1 213 and thread N 209, may share a compute memory object, such as a stream, stored in a computing device memory 217 coupled to the computing device 201. A computing device memory 217 may include a global memory and a constant memory. A global memory may be used to allocate compute memory objects, such as streams. A compute memory object may include a collection of data elements that can be operated on by a compute program executable. A compute memory object may represent an image, a texture, a frame-buffer, an array of a scalar data type, an array of a user-defined structure, buffer, subbuffer, or a variable, etc. A constant memory may be read-only memory storing constant variables frequently used by a compute program executable.

In one embodiment, a local memory for a compute processor or compute unit may be used to allocate variables shared by all thread in a thread group or a thread group. A local memory may be implemented as a dedicated local storage, such as local shared memory 219 for Processor_1 and local shared memory 211 for Processor_L. In another embodiment, a local memory for a compute processor may be implemented as a read-write cache for a computing device memory for one or more compute processors of a computing device, such as data cache 215 for compute processors 205, 203 in the computing device 201. A dedicated local storage may not be shared by threads across different thread groups. If the local memory of a compute processor, such as Processor_1 205 is implemented as a read-write cache, e.g. data cache 215, a variable declared to be in the local memory may be allocated from the computing device memory 217 and cached in the read-write cache, e.g. data cache 215 that implements the local memory. Threads within a thread group may share local variables allocated in the computing device memory 217 when, for example, neither a read-write cache nor dedicated local storage are available for the corresponding computing device. In one embodiment, each thread is associated with a private memory to store thread private variables that are used by functions called in the thread. For example, private memory 1 211 may not be seen by threads other than thread 1 213.

Furthermore, in one embodiment, compute device memory 217 includes a buffer 223 that is used to store data used by the processor_1 205-processor_L 203. Buffer 223 can be a one dimensional buffer, two-dimensional image, three-dimensional image, or other type of buffer as known in the art. In one embodiment, the compute device 201 stores data to be operated on by the processors (e.g., processor_1 205-processor_L 203) in buffer 223. For example and in one embodiment, the buffer can store an array of data, a two-dimensional image, a three-dimensional image, etc., and/or other data as known in the art. In one embodiment, data between the buffer 223 and other memory in system 201 (private memory 211, 207, local shared memory 219, 221, data cache 215, etc.) can be transfer using any method known in the art for inter-memory data transfer (direct PCIe transfer, asynchronous direct memory access, etc.)

Figure 3:
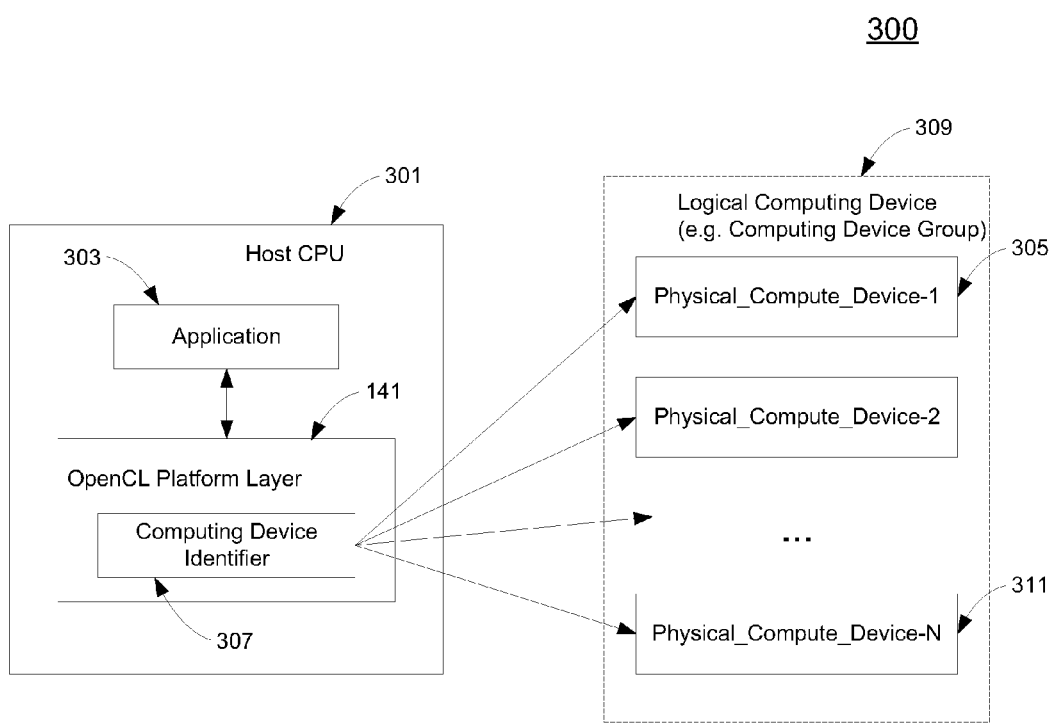
FIG. 3 is a block diagram illustrating one embodiment of a plurality of physical computing devices configured as a logical computing device using a computing device identifier.

FIG. 3 is a block diagram illustrating one embodiment of a plurality of physical computing devices configured as a logical computing device using a computing device identifier. In one embodiment, an application 303 and a platform layer 305 may be running in a host CPU 301. The application 303 may be one of the applications 103 of FIG. 1. Hosting systems 101 may include the host CPU 301. Each of the physical computing devices Physical_Compute_Device-1 305 through Physical_Compute_Device-N 311 may be one of the CPUs 117 or GPUs 115 of FIG. 1. In one embodiment, the compute platform layer 141 may generate a computing device identifier 307 in response to API requests from the application 303 for configuring data parallel processing resources according to a list of capability requirements included in the API requests. The computing device identifier 307 may refer to a selection of actual physical computing devices Physical_Compute_Device-1 305 through Physical_Compute_Device-N 311 according to the configuration by the compute platform layer 141. In one embodiment, a logical computing device 309 may represent the group of selected actual physical computing devices separate from the host CPU 301.

Figure 4:
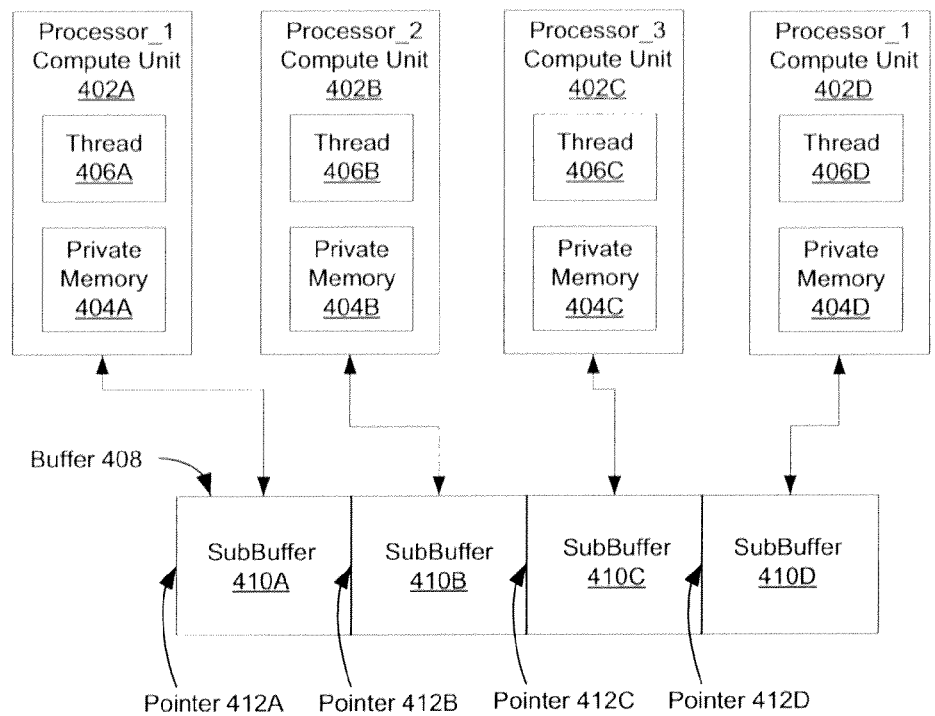
FIG. 4 is a block diagram illustrating one embodiment of a buffer sub-divided into multiple subbuffers.

FIG. 4 is a block diagram illustrating one embodiment of a buffer sub-divided into multiple subbuffers. In one embodiment, buffer 408 is the buffer 223 as illustrated in FIG. 2 above. In FIG. 4, buffer 408 is allocated memory that is used to store data that is used by the compute units 402A-D. Buffer 408 can be a one-dimensional array, two dimensional image, three-dimensional image, or other type of buffer as known in the art. Buffer 408 is further subdivided into multiple sub-buffers 410A-D. In one embodiment, each subbuffer 410A-D is referenced by a pointer 412A-D into the buffer. For example and in one embodiment, subbuffer 410A is referenced by pointer 412A, subbuffer 410B is referenced by pointer 412B, subbuffer 410C is referenced by pointer 412C, and subbuffer 410D is referenced by pointer 412D. In one embodiment, these pointers 412A-D indicate the start of each buffer. In this embodiment, to access the data in the subbuffers 410A-D, the compute units 402A-D would provide the corresponding pointer 412A-D and an offset to the desired region of the subbuffer 410-D.

In one embodiment, each compute unit 402A-D is associated with one of the subbuffers 410A-D of buffer 408. In one embodiment, each of these compute units 402A-D use the data for the compute task assigned to each compute unit. Each of the compute units can read and/or write data to the corresponding subbuffer 410A-D. For example and in one embodiment, compute unit 402A uses to subbuffer 410A, compute unit 402B uses to subbuffer 410B, compute unit 402C uses to subbuffer 410C, and compute unit 402D uses to subbuffer 410D. In this embodiment, to access the data in the subbuffers 410A-D, the compute units 402A-D would provide the corresponding pointer 412A-D and an offset to the desired region of the subbuffer 410-D. The offsets can be an array index, two-dimensional reference, three-dimensional reference, etc. Buffer 408 structure is further described in FIGS. 5-7 below.

In one embodiment, each subbuffer is created by a function call and providing a buffer pointer and subbuffer size value. Creating a subbuffer is further described in FIG. 10 below.

In one embodiment, a compute unit 402A-D transfers data from the corresponding subbuffer 410A-D to the private memory 404A-D of that compute unit 402A-D. In one embodiment, the private memory 404A-D is memory that is local to the compute unit (e.g., private memory 1-M 211, private memory 1-N 207, local shared memory 219 and 221, and/or data cache 215 as illustrated in FIG. 2). In one embodiment, the compute unit 402A-D transfers the data over a bus coupling the compute units 402A-D and the memory that contains buffer 408. For example and in one embodiment, the coupling bus is a Peripheral Component Interface-type bus (PCI, PCI-Express (PCIe), etc.) and the transfer mechanism is a PCI direct memory transfer.

Figure 5:
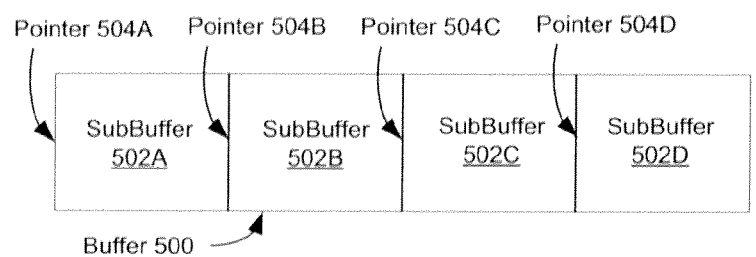
FIG. 5 is a block diagram illustrating one embodiment of multiple subbuffers in a one-dimensional buffer.

FIG. 5 is a block diagram illustrating one embodiment of multiple subbuffers 502A-D in a one-dimensional buffer 500. In FIG. 5, while buffer 500 is illustrated with four subbuffers 502A-D, in alternate embodiments, buffer 500 can have more or less subbuffers and/or subbuffers of varying size. In one embodiment, buffer 500 is a one-dimensional array of a data type (ints, floats, strings, user-defined structs, user-defined objects, etc.). To reference data one of the subbuffers 502A-D, an offset from a start pointer 504A-D of the subbuffer 502A-D can be used. For example and in one embodiment, buffer 500 is two arrays of a billion floats each. In this example, the compute units will add the contents of the array together and each subbuffer 502A-D contains parts of the two arrays (e.g., each subbuffer 502A-D has half a billion floats for each of the two arrays, one billion floats in total). The compute units in this example transfer the data from the subbuffer corresponding to the compute unit, add the floats, and store the resulting value into the subbuffer.

Figure 6:
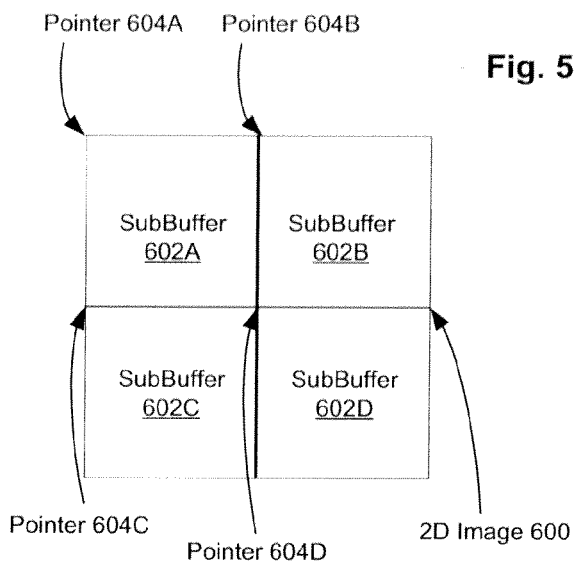
FIG. 6 is a block diagram illustrating one embodiment of a two-dimensional image sub-divided into multiple subbuffers.

FIG. 6 is a block diagram illustrating one embodiment of a two-dimensional image buffer 600 sub-divided into multiple subbuffers 602A-D. In FIG. 6, while buffer 600 is illustrated with four subbuffers 602A-D, in alternate embodiments, buffer 600 can have more or less subbuffers and/or subbuffers of varying size. In FIG. 6, two-dimensional image buffer 600 is a two-dimensional buffer that contains data referenced by an x-offset and y-offset. This buffer can store data of varying types (ints, floats, strings, user-defined structs, user-defined objects, etc.) For example and in one embodiment, buffer 600 can store a two-dimensional image of pixels in the x- and y-direction. For example, in one embodiment, buffer 600 stores a two-dimensional image in order to compute a color histogram of the stored image. In this example, the image is sub-divided into four sub-buffers 602A-D and each subbuffer 602A-D is used by a compute unit to hold the part of the image that the compute unit is processing. Furthermore, each compute unit copies relevant portion of the image from the corresponding subbuffer into the private memory of the compute unit. The compute unit computes the histogram information using that image data and returns the histogram information.

Figure 7:
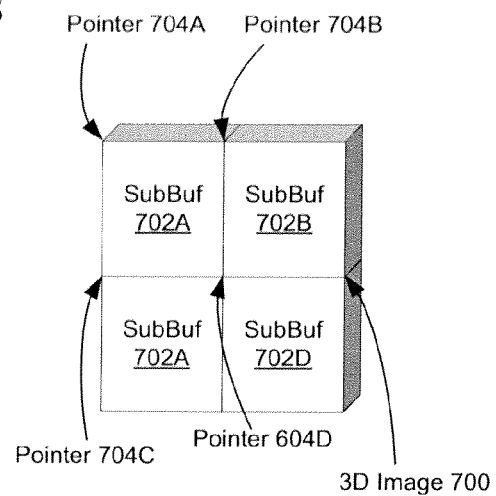
FIG. 7 is a block diagram illustrating one embodiment of a three-dimensional image sub-divided into multiple subbuffers.

FIG. 7 is a block diagram illustrating one embodiment of a three-dimensional image buffer 700 sub-divided into multiple subbuffers 702A-D. In FIG. 7, while buffer 700 is illustrated with four subbuffers 702A-D, in alternate embodiments, buffer 700 can have more or less subbuffers and/or subbuffers of varying size. In FIG. 7, three-dimensional image buffer 700 is a three-dimensional buffer that contains data referenced by an x-, y-, and z-offset or other suitable system for referencing a location in a three-dimensional space. As with buffers 500 and 600, this buffer 700 can store data of varying types (ints, floats, strings, user-defined structs, user-defined objects, etc.). For example and in one embodiment, buffer 700 can store a three-dimensional image of pixels in the x-, y-, and z-direction.

Figure 8:
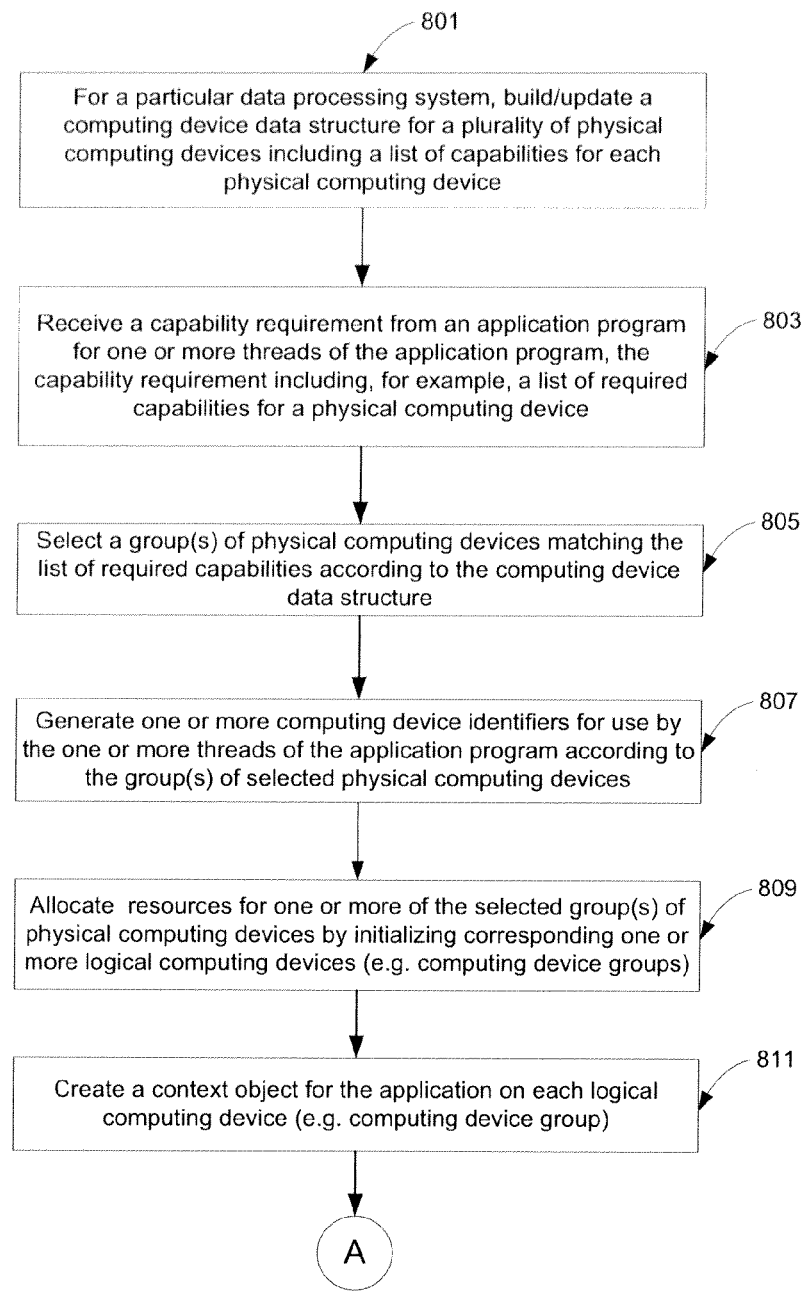
FIG. 8 is a flow diagram illustrating an embodiment of a process to configure a plurality of physical computing devices with a computing device identifier by matching a capability requirement received from an application.

FIG. 8 is a flow diagram illustrating an embodiment of a process 800 to configure a plurality of physical computing devices with a compute device identifier by matching a capability requirement received from an application. Exemplary process 800 may be performed by a processing logic that may comprise hardware (circuitry, dedicated logic, etc.), software (such as is run on a dedicated machine), or a combination of both. For example, process 800 may be performed in accordance with the system 100 of FIG. 1 in a data processing system hosted by the hosting systems 101. The data processing system may include a host processor hosting a platform layer, such as compute platform layer 141 of FIG. 1, and multiple physical computing devices attached to the host processor, such as CPUs 117 and GPUs 115 of FIG. 1.

At block 801, in one embodiment, the processing logic of process 800 may build a data structure (or a computing device data structure) representing multiple physical computing devices associated with one or more corresponding capabilities. Each physical computing device may be attached to the processing system performing the processing logic of process 800. Capabilities or compute capabilities of a physical computing device, such as CPU or GPU, may include whether the physical computing device support a processing feature, a memory accessing mechanism, a named extension or associated limitations. A processing feature may be related to dedicated texturing hardware support, double precision floating point arithmetic or synchronization support (e.g. mutex).

Capabilities of a computing device may include a type indicating processing characteristics or limitations associated with a computing device. An application may specify a type of required computing device or query the type of a specific computing device using APIs. Examples of different types of computing devices are shown in the following table:

TABLE 1

| cl_device_type | Description |
| --- | --- |
| CL_DEVICE_TYPE_CPU | A computing device that is the host processor. The host processor runs the OpenCL implementations and is a single or multi-core CPU. |
| CL_DEVICE_TYPE_GPU | A computing device that is a GPU. By this we mean that the device can also be used to accelerate a 3D API such as OpenGL or DirectX. |
| CL_DEVICE_TYPE_ACCELERATOR | Dedicated computing accelerators (for example the IBM CELL Blade). These devices communicate with the host processor using a peripheral interconnect such as PCIe. |
| CL_DEVICE_TYPE_DEFAULT | The default computing device in the system. |
| CL_DEVICE_TYPE_ALL | All computing devices available in the system. |

Additionally, capabilities of a computing device may include, for example, configuration values as shown in the following table:

TABLE 2

| cl_device_info | Description |
| --- | --- |
| CL_DEVICE_TYPE | The computing device type. Currently supported values are: CL_DEVICE_TYPE_CPU, CL_DEVICE_TYPE_GPU, CL_DEVICE_TYPE_ACCELERATOR, CL_DEVICE_TYPE_DEFAULT or a combination of the above. |
| CL_DEVICE_VENDOR_ID | A unique device vendor identifier. An example of a unique device identifier could be the PCIe ID. |
| CL_DEVICE_MAX_COMPUTE_UNITS | The number of parallel compute cores on the computing device. The minimum value is 1. |
| CL_DEVICE_MAX_WORK_ITEM_DIMENSIONS | Maximum dimensions that specify the global and local work-item IDs used by the data parallel execution model. |
| CL_DEVICE_MAX_WORK_ITEM_SIZES | Maximum number of work-items that can be specified in each dimension of the work-group. |
| CL_DEVICE_MAX_WORK_GROUP_SIZE | Maximum number of work-items in a work-group executing a kernel using the data parallel execution model. |
| CL_DEVICE_PREFERRED_VECTOR_WIDTH_CHAR CL_DEVICE_PREFERRED_VECTOR_WIDTH_SHORT CL_DEVICE_PREFERRED_VECTOR_WIDTH_INT CL_DEVICE_PREFERRED_VECTOR_WIDTH_LONG CL_DEVICE_PREFERRED_VECTOR_WIDTH_FLOAT CL_DEVICE_PREFERRED_VECTOR_WIDTH_DOUBLE | Preferred native vector width size for built-in scalar types that can be put into vectors. The vector width is defined as the number of scalar elements that can be stored in the vector. |
| CL_DEVICE_MAX_CLOCK_FREQUENCY | Maximum configured clock frequency of the device in MHz. |
| CL_DEVICE_ADDRESS_BITS | The default compute device address space size specified as an unsigned integer value in bits, for example, 32 or 64 bits. |
| CL_DEVICE_MAX_MEM_ALLOC_SIZE | Max size of memory object allocation in bytes. The minimum value is max ($\frac{1}{4}^{th}$ of CL_DEVICE_GLOBAL_MEM_SIZE, 128 * 1024 * 1024) |
| CL_DEVICE_IMAGE_SUPPORT | Is CL_TRUE if images are supported by the computing device and CL_FALSE otherwise. |
| CL_DEVICE_MAX_READ_IMAGE_ARGS | Max number of simultaneous image objects that can be read by a kernel. |

TABLE 2-continued

| cl_device_info | Description |
|---|---|
| CL_DEVICE_MAX_WRITE_IMAGE_ARGS | Max number of simultaneous image objects that can be written to by a kernel. |
| CL_DEVICE_IMAGE2D_MAX_WIDTH | Max width of 2D image in pixels. The minimum value is 8192. |
| CL_DEVICE_IMAGE2D_MAX_HEIGHT | Max height of 2D image in pixels. The minimum value is 8192. |
| CL_DEVICE_IMAGE3D_MAX_WIDTH | Max width of 3D image in pixels. The minimum value is 2048. |
| CL_DEVICE_IMAGE3D_MAX_HEIGHT | Max height of 3D image in pixels. The minimum value is 2048 if CL_DEVICE_IMAGE_SUPPORT is CL_TRUE. |
| CL_DEVICE_IMAGE3D_MAX_DEPTH | Max depth of 3D image in pixels. The minimum value is 2048. |
| CL_DEVICE_MAX_SAMPLERS | Maximum number of samplers that can be used in a kernel. The minimum value may be 16. |
| CL_DEVICE_MAX_PARAMETER_SIZE | Max size in bytes of the arguments that can be passed to a kernel. The minimum value is 256. |
| CL_DEVICE_MEM_BASE_ADDR_ALIGN | Describes the alignment in bits of the base address of any allocated memory object. |
| CL_DEVICE_MIN_DATA_TYPE_ALIGN_SIZE | The smallest alignment in bytes which can be used for any data type. |
| CL_DEVICE_SINGLE_FP_CONFIG | Describes single precision floating-point capability of the device. This is a bit-field that describes one or more of the following values: CL_FP_DENORM - denorms are supported CL_FP_INF_NAN - INF and quiet NaNs are supported. CL_FP_ROUND_TO_NEAREST - round to nearest even rounding mode supported CL_FP_ROUND_TO_ZERO - round to zero rounding mode supported CL_FP_ROUND_TO_INF - round to +ve and −ve infinity rounding modes supported CL_FP_FMA - IEEE754-2008 fused multiply-add is supported. The mandated minimum floating-point capability is: CL_FP_ROUND_TO_NEAREST\| CL_FP_INF_NAN. |
| CL_DEVICE_GLOBAL_MEM_CACHE_TYPE | Type of global memory cache supported. Valid values are: CL_NONE, CL_READ_ONLY_CACHE and CL_READ_WRITE_CACHE. |
| CL_DEVICE_GLOBAL_MEM_CACHELINE_SIZE | Size of global memory cache line in bytes. |
| CL_DEVICE_GLOBAL_MEM_CACHE_SIZE | Size of global memory cache in bytes. |
| CL_DEVICE_GLOBAL_MEM_SIZE | Size of global device memory in bytes. |
| CL_DEVICE_MAX_CONSTANT_BUFFER_SIZE | Max size in bytes of a constant buffer allocation. The minimum value is 64 KB. |
| CL_DEVICE_MAX_CONSTANT_ARGS | Max number of arguments declared with the_constant qualifier in a kernel. The minimum value is 8. |
| CL_DEVICE_LOCAL_MEM_TYPE | Type of local memory supported. For example, this can be set to CL_LOCAL implying dedicated local memory storage such as SRAM, or CL_GLOBAL. |
| CL_DEVICE_LOCAL_MEM_SIZE | Size of local memory arena in bytes. |
| CL_DEVICE_ERROR_CORRECTION_SUPPORT | Is CL_TRUE if the device implements error correction for the memories, caches, registers etc. in the device. Is CL_FALSE if the device does not implement error correction. |
| CL_DEVICE_PROFILING_TIMER_RESOLUTION | Describes the resolution of device timer. This is measured in nanoseconds. |
| CL_DEVICE_ENDIAN_LITTLE | Is CL_TRUE if the computing device is a little endian device and CL_FALSE otherwise. |
| CL_DEVICE_AVAILABLE | Is CL_TRUE if the device is available and CL_FALSE if the device is not available. |

TABLE 2-continued

| cl_device_info | Description |
| --- | --- |
| CL_DEVICE_COMPILER_AVAILABLE | Is CL_FALSE if the implementation does not have a compiler available to compile the program source. Is CL_TRUE if the compiler is available. This can be CL_FALSE for the embedded platform profile only. |
| CL_DEVICE_EXECUTION_CAPABILITIES | Describes the execution capabilities of the device. This is a bit-field that describes one or more of the following values: CL_EXEC_KERNEL - The computing device can execute computing kernels. CL_EXEC_NATIVE_KERNEL - The computing device can execute native kernels. The mandated minimum capability is: CL_EXEC_KERNEL. |
| CL_DEVICE_QUEUE_PROPERTIES | Describes the command-queue properties supported by the device. This is a bit-field that describes one or more of the following values: CL_QUEUE_OUT_OF_ORDER_EXEC_MODE_ENABLE CL_QUEUE_PROFILING_ENABLE The mandated minimum capability is: CL_QUEUE_PROFILING_ENABLE. |
| CL_DEVICE_PLATFORM | The platform associated with this device. |
| CL_DEVICE_NAME | Device name string. |
| CL_DEVICE_VENDOR | Vendor name string. |
| CL_DRIVER_VERSION | Computing software driver version string in the form major_number.minor_number. |
| CL_DEVICE_PROFILE1 | Computing profile string. Returns the profile name supported by the device. The profile name returned can be one of the following strings: FULL_PROFILE - if the device supports the computing specification (functionality defined as part of the core specification and does not require any extensions to be supported). EMBEDDED_PROFILE - if the device supports the computing embedded profile. |
| CL_DEVICE_VERSION | Computing version string. Returns the computing version supported by the device. |
| CL_DEVICE_EXTENSIONS | A string of optional features supported. The list of extension names returned currently can include one or more of the following approved extension names: cl_khr_fp64 cl_khr_select_fprounding_mode cl_khr_global_int32_base_atomics cl_khr_global_int32_extended_atomics cl_khr_local_int32_base_atomics cl_khr_local_int32_extended_atomics cl_khr_int64_base_atomics cl_khr_int64_extended_atomics cl_khr_3d_image_writes cl_khr_byte_addressable_store cl_khr_fp16 cl_khr_gl_sharing |

1 The platform profile returns the profile that is implemented by the OpenCL framework. If the platform profile returned is FULL_PROFILE, the OpenCL framework will support devices that are FULL_PROFILE and may also support devices that are EMBEDDED PROFILE. The compiler must be available for all devices i.e. CL_DEVICE_COMPILER_AVAILABLE is CL_TRUE. If the platform profile returned is EMBEDDED_PROFILE, then devices that are only EMBEDDED_PROFILE are supported.

A memory accessing mechanism for a physical processing device may be related to a type of variable cache (e.g., no support, read-only, or read-write), a type of compute memory object cache, size of cache support, a dedicated local memory support or associated limitations. Memory accessing limitations may include a maximum number of compute memory objects that can be simultaneously read or written by a compute program executable, a maximum number of compute memory objects that can be allocated, or a maximum size along a dimension of a multi-dimensional compute memory object, for example, a maximum width of a compute memory object for a 2D (two-dimensional) image. A system application of the data processing system may update the data structure in response to attaching a new physical computing device to a data processing system. In one embodiment, the capabilities of a physical computing device may be predetermined. In another embodiment, a system application of the data processing system may discover a newly attached physical processing device during run time. The system application may retrieve the capabilities of the newly discovered physical computing device to update the data structure representing the attached physical computing devices and their corresponding capabilities.

According to one embodiment, the processing logic of process 800 may receive a compute capability requirement from an application at block 803. The application may send the compute capability requirement to a system application by calling APIs. The system application may correspond to a platform layer of a software stack in a hosting system for the application. In one embodiment, a compute capability requirement may identify a list of required capabilities for requesting processing resources to perform a task for the application. In one embodiment, the application may require the requested processing resources to perform the task in multiple threads concurrently. In response, the processing logic of process 800 may select a group of physical computing devices from attached physical computing devices at block 805. The selection may be determined based on a matching between the compute capability requirements against the compute capabilities stored in the capability data structure. In one embodiment, the processing logic of process 800 may perform the matching according to a hint provided by the capability requirement.

The processing logic of process 800 may determine a matching score according to the number of compute capabilities matched between a physical computing device and the compute capability requirement. In one embodiment, the processing logic of process 800 may select multiple physical computing devices with highest matching scores. In another embodiment, the processing logic of process 800 may select a physical computing device if each capability in the capability requirement is matched. The processing logic of process 800 may determine multiple groups of matching physical computing devices at block 805. In one embodiment, each group of matching physical computing devices is selected according to a load balancing capability of each device. At block 807, in one embodiment, the processing logic of process 800 may generate a computing device identifier for each group of physical computing devices selected at block 805. The processing logic of process 800 may return one or more of the generated computing device identifiers back to the application through the calling APIs. An application may choose which processing resources to employ for performing a task according to the computing device identifiers. In one embodiment, the processing logic of process 800 may generate at most one computing device identifier at block 807 for each capability requirement received.

At block 809, in one embodiment, the processing logic of process 800 may allocate resources to initialize a logical computing device for a group of physical computing devices selected at block 805 according to a corresponding computing device identifier. A logical computing device may be a computing device group including one or more physical computing devices. The processing logic of process 800 may perform initializing a logical computing device in response to API requests from an application which has received one or more computing device identifiers according to the selection at block 805.

The processing logic of process 800 may create a context object on the logical computing device for an application at block 811. Commands that operate on compute memory object, compute program objects and/or compute program executables for a context object may be executed in-order (e.g. synchronously) or out of order (e.g. asynchronously) according to parameters specified in API requests when creating the context object. Profiling commands that operate on compute memory objects, compute programs or compute kernels may be enabled for a context object using API requests. In one embodiment, a context object is associated with one application thread in a hosting system running the application. Multiple threads performing processing tasks in one logical computing device or across different logical computing devices concurrently may be based on separate context objects.

In one embodiment, the processing logic of process 800 may be based on multiple APIs including clCreateContext, clRetainContext and clReleaseContext. The API clCreateContext creates a compute context. A compute context may correspond to a compute context object. The API clRetainContext increments the number of instances using a particular compute context identified by a context as an input argument to clRetainContext. The API clCreateContext does an implicit retain. This is useful for third-party libraries, which typically get a context passed to them by the application. However, it is possible that the application may delete the context without informing the library. Allowing multiple instances to attach to a context and release from a context solves the problem of a compute context being used by a library no longer being valid. If an input argument to clRetainContext does not correspond to a valid compute context object, clRetainContext returns CU_INVALID_CONTEXT. The API clReleaseContext releases an instance from a valid compute context. If an input argument to clReleaseContext does not correspond to a valid compute context object, clReleaseContext returns CU_INVALID_CONTEXT.

Figure 9:
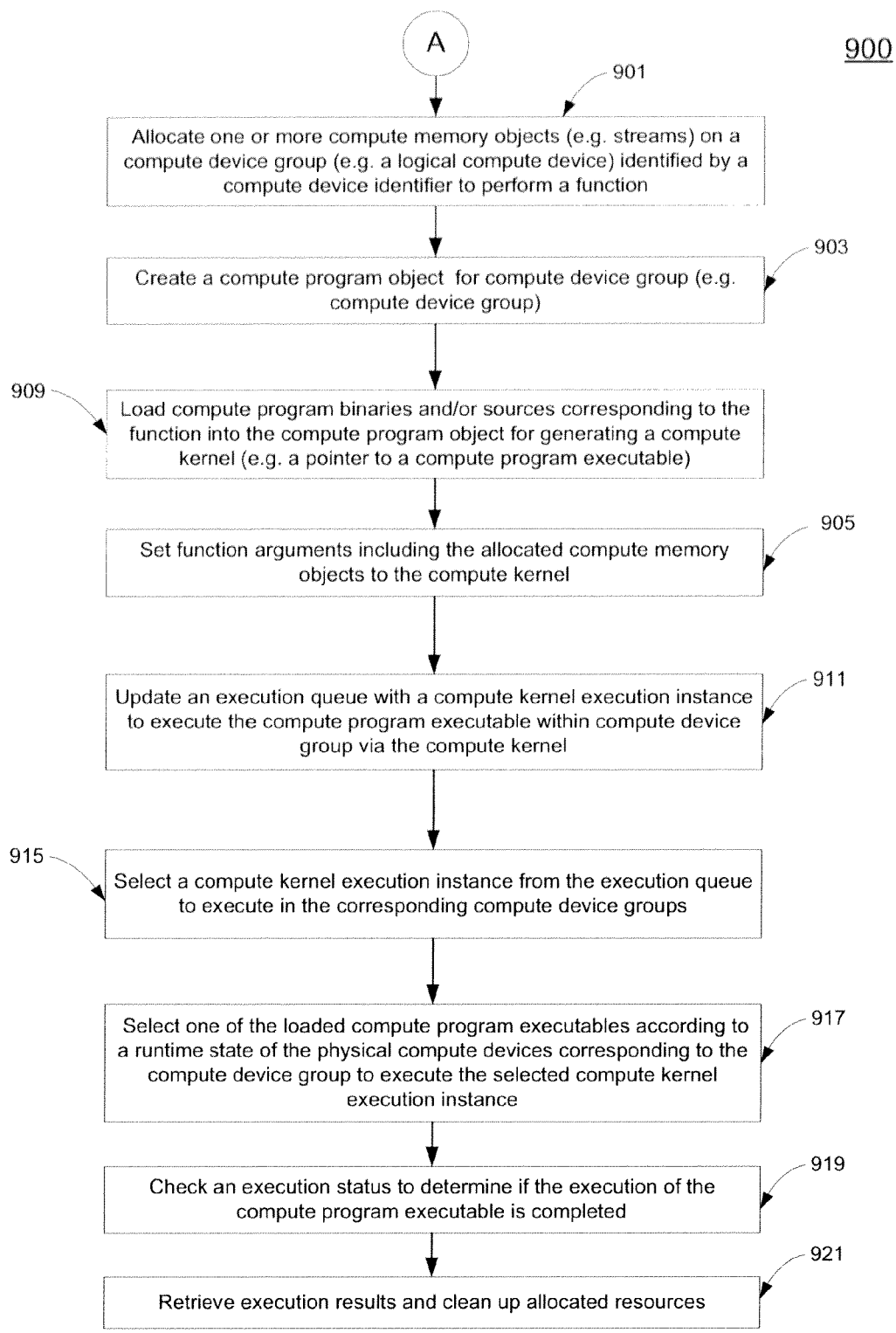
FIG. 9 is a flow diagram illustrating an embodiment of a process to execute a compute executable in a logical computing device.

FIG. 9 is a flow diagram illustrating an embodiment of an example process 900 to execute a compute executable in a logical computing device. In one embodiment, process 900 may be performed by a runtime layer in a data processing system such as the compute runtime layer 109 of FIG. 1. At block 901, the processing logic of process 900 may allocate one or more compute memory objects (e.g. streams) in a logical computing device to execute a compute executable. A compute memory object may include one or more data elements to represent, for example, an image memory object or an array memory object. An array memory object may be a one-dimensional collection of data element. An image memory object may be a collection to store two-dimensional, three-dimensional or other multi-dimensional data, such as a texture, a frame buffer or an image. A processing task may be performed by a compute program executable operating on compute memory objects or streams using compute memory APIs including reading from input compute memory objects and writing to output compute memory objects. In one embodiment, a compute memory object may be attached to a data object, such as a buffer object, texture object or a render buffer object, for updating the data object using compute memory APIs. A data object may be associated with APIs that activate graphics data processing operations, such as text rendering, on the data object. In one embodiment, a memory object is a buffer with multiple subbuffers as described in FIG. 2 above.

When allocating a compute memory object, the processing logic of process 900 may determine where the allocation should reside according to specifications in an API. For example, a compute memory object may be allocated out of a host memory, such as a host memory for the hosting systems 101 of FIG. 1 and/or a computing device memory, such as a global memory or a constant memory 217 of FIG. 2. A compute memory object allocated in a host memory may need to be cached in a computing device memory. The processing logic of process 900 may asynchronously load data into allocated compute memory objects using non blocking API interfaces, e.g. based on generated event objects which include synchronization data indicating whether data has been loaded into a compute memory object. In one embodiment, the processing logic of process 900 may schedule memory access operations when reading from or writing to allocated compute memory objects. The processing logic of process 900 may map an allocated stream memory to form a logical address of an application. In one embodiment, the processing logic of process 900 may perform operations at block 901 based API requests from an application running in a host processor, such as applications 103 of FIG. 1.

At block 903, according to one embodiment, the processing logic of process 900 may create a compute program object for the logical computing device (e.g. a computing device group). A compute program object may include a group of compute kernels representing exported functions or entry points of a data parallel program. A compute kernel may include a pointer to a compute program executable that can be executed on a compute unit to perform a data parallel task (e.g. a function). Each compute kernel may be associated with a group of function arguments including compute memory objects or streams allocated for function inputs or outputs, such as the streams allocated at block 901.

The processing logic of process 900 may load a compute program binary and/or a compute program source into the compute program object at block 909. A compute program binary may include bits that describe a compute program executable that will be run on a computing device. A compute program binary may be a compute program executable and/or an intermediate representation of a compute program source to be converted into a compute program executable. In one embodiment, a compute program executable may include description data associated with, for example, the type of target physical computing devices (e.g. a GPU or a CPU), versions, and/or compilation options or flags, such as a thread group sizes and/or thread group dimensions. A compute program source may be the source code where a compute program executable is compiled from. The processing logic of process 900 may load multiple compute program executables corresponding to a compute program source at block 909. In one embodiment, the processing logic of process 900 may load a compute program executable from an application or through a compute library such as compute application library 105 of FIG. 1. A compute program executable may be loaded with the corresponding compute program source. The processing logic of process 900 may set up function arguments for a compute program object at block 905. In one embodiment, the processing logic of process 900 may perform operations at blocks 903, 905 and 909 according to API requests from an application.

At block 911, the processing logic of process 900 may update an execution queue to execute the compute kernel object with a logical computing device. The processing logic of process 900 may execute a computer kernel in response to API calls with appropriate arguments to a compute runtime, e.g. compute runtime 109 of FIG. 1, from an application or a compute application library, such as applications 103 or compute application library 105 of FIG. 1. Executing a compute kernel may include executing a compute program executable associated with the compute kernel. In one embodiment, the processing logic of process 900 may generate a compute kernel execution instance to execute a compute kernel. API calls to a compute runtime, such as compute runtime 109 of FIG. 1, to execute a compute kernel may be asynchronous in nature. An execution instance may be identified by a compute event object that may be returned by a compute runtime, such as compute runtime 109 of FIG. 1. A compute kernel execution instance may be added to an execution queue to execute a compute kernel instance.

In one embodiment, API calls to a compute runtime to execute a compute kernel may include the number of threads that execute simultaneously in parallel on a compute processor as a thread group. An API call may include the number of compute processors to use. A compute kernel execution instance may include a priority value indicating a desired priority to execute the corresponding compute program executable. A compute kernel execution instance may also include an event object identifying a previous execution instance and/or expected total number of threads and number of thread groups to perform the execution. The number of thread groups and total number of threads may be specified in the API calls. In one embodiment, an event object may indicate an execution order relationship between the execution instance that includes the event object and another execution instance identified by the event object. An execution instance including an event object may be required to be executed after another execution instance identified by the event object finishes execution. An event object may be referred to as a queue_after_event_object. Events and event dependencies are further described in FIGS. 11 and 12 below. In one embodiment, an execution queue may include multiple compute kernel execution instances for executing corresponding compute program executables. One or more compute kernel execution instances for a compute program executable may be scheduled for execution in an execution queue. In one embodiment, the processing logic of process 900 may update the execution queue in response to API requests from an application. The execution queue may be hosted by the hosting data systems where the application is running.

At block 913, the processing logic of process 900 may select a compute kernel execution instance from the execution queue for execution. In one embodiment, the processing logic of process 900 may select more than one compute kernel execution instances to be executed concurrently according to the corresponding logical computing devices. The processing logic of process 900 may determine whether a compute kernel execution instance is selected from the execution queue based on its associated priority and dependency relationships with other execution instances in the execution queue. A compute kernel execution instance may be executed by executing its corresponding compute kernel object according to an executable loaded to the compute kernel object.

At block 917, in one embodiment, the processing logic of process 900 may select one of the plurality of executables loaded to the compute kernel object corresponding to the selected compute kernel instance for execution in a physical computing device associated with the logical computing device for the compute kernel object. The processing logic of process 900 may select more than one executables to be executed in more than one physical computing device in parallel for one compute kernel execution instance. The selection may be based on current execution statuses of the physical computing devices corresponding to the logical computing device associated with the selected compute kernel execution instance. An execution status of a physical computing device may include the number of threads running, the local memory usage level and the processor usage level (e.g. peak number of operations per unit time), etc. In one embodiment, the selection may be based on predetermined usage levels. In another embodiment, the selection may be based on the number of threads and number of thread groups associated with the compute kernel execution instance. The processing logic of process 900 may retrieve an execution status from a physical computing device. In one embodiment, the processing logic of process 900 may perform operations to select a compute kernel execution instance from the execution queue to execute at blocks 913 917 asynchronously to applications running in hosting systems.

At block 919, the processing logic of process 900 may check the execution status of a compute kernel execution instance scheduled for execution in the execution queue. Each execution instance may be identified by a unique compute event object. An event object may be returned to an application or a compute application library, such as application 103 or compute application library 105 of FIG. 9, which calls APIs to execute the execution instance, when the corresponding compute kernel execution instance was queued according to a compute runtime, such as the runtime 109 of FIG. 1. In one embodiment, the processing logic of process 900 may perform the execution status checking in response to API requests from an application. The processing logic of process 900 may determine the completion of executing a compute kernel execution instance by querying a status of the compute event object identifying the compute kernel execution instance. The processing logic of process 900 may wait until the execution of a compute kernel execution instance is complete to return to API calls from an application. The processing logic of process 900 may control processing execution instances reading and/or writing from various streams based on compute event objects.

At block 921, according to one embodiment, the processing logic of process 900 may retrieve results of executing a compute kernel execution instance. Subsequently, the processing logic of process 900 may clean up processing resources allocated for executing the compute kernel execution instance. In one embodiment, the processing logic of process 900 may copy a stream memory holding results of executing a compute kernel executable into a local memory. The processing logic of process 900 may delete variable streams or image streams allocated at block 901. The processing logic of process 900 may delete a kernel event object for detecting when a compute kernel execution is completed. If each compute kernel execution instance associated with a specific compute kernel object has been completely executed, the processing logic of process 900 may delete the specific compute kernel object. In one embodiment, the processing logic of process 900 may perform operations at block 921 based on API requests initiated by an application.

Figure 10:
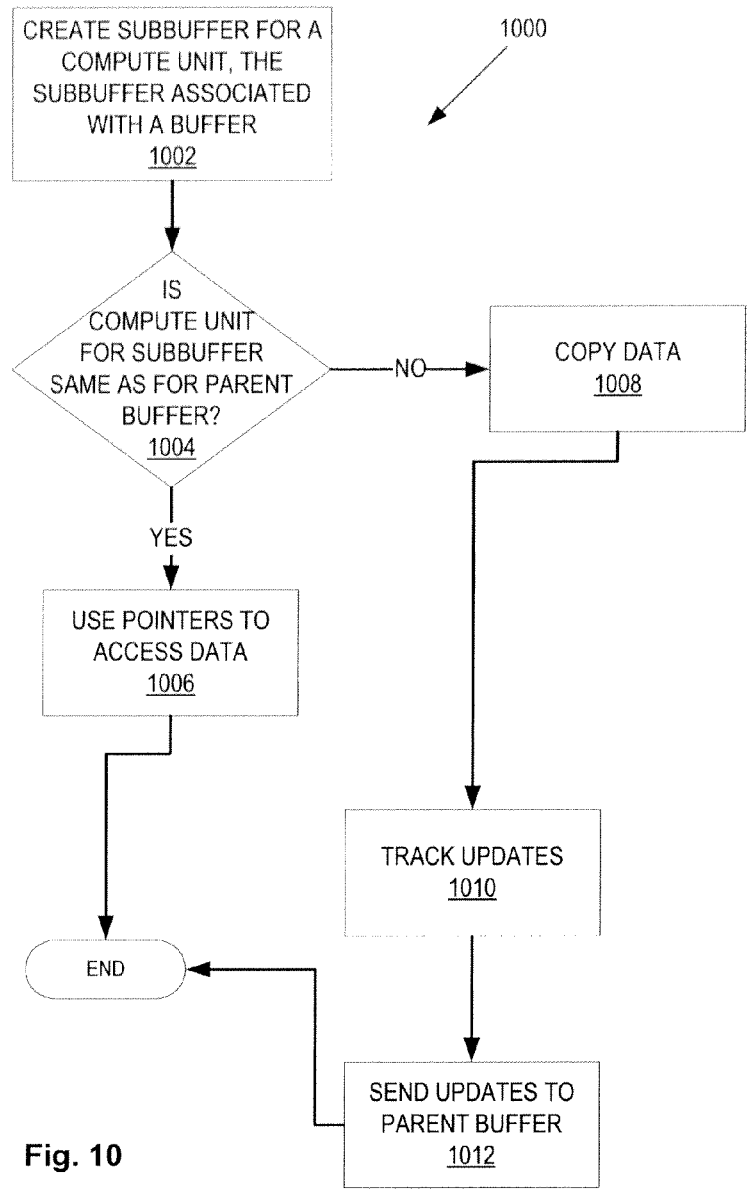
FIG. 10 is a flow diagram illustrating an embodiment of a runtime process to creating and using subbuffers with multiple compute units.

FIG. 10 is a flow diagram illustrating an embodiment of a runtime process 1000 to create and use subbuffers with multiple compute units. Exemplary process 1000 may be performed by a processing logic that may comprise hardware (circuitry, dedicated logic, etc.), software (such as is run on a dedicated machine), or a combination of both. For example, process 1000 may be performed in accordance with the system 100 of FIG. 1 in a data processing system hosted by the hosting systems 101. The data processing system may include a host processor hosting a platform layer, such as compute platform layer 141 of FIG. 1, and multiple physical computing devices attached to the host processor, such as CPUs 117 and GPUs 115 of FIG. 1.

In FIG. 10, process 1000 creates a subbuffer for a compute unit, where the subbuffer is associated with a buffer. In one embodiment, process 1000 creates a subbuffer from a currently allocated buffer. For example and in one embodiment, process 1000 creates a subbuffer from an allocated buffer using the function call:

| | |
|---|---|
| cl_mem | clCreateSubBuffer (cl_mem buffer, |
| | cl_mem_flags flags, |
| | cl_buffer_create_type buffer_create_type, |
| | const void buffer_create_info, |
| | cl_int *errcode_ret) | where buffer is an existing buffer, flags is a bit-field that is used to specify allocation and usage information about the image memory object being created and is described in Table 3, size is the size in bytes of the subbuffer memory object to be allocated, buffer_create_type and buffer_create_info describe the type of buffer object to be created. The list of supported values for buffer_create_type and corresponding descriptor that buffer_create_info points to is described in Table 4.

TABLE 3

Subbuffer memory creation flags.

| cl_mem_flags | Description |
|---|---|
| CL_MEM_READ_WRITE | This flag specifies that the memory object will be read and written by a kernel. This is the default. |
| CL_MEM_WRITE_ONLY | This flags specifies that the memory object will be written but not read by a kernel. |
| CL_MEM_READ_ONLY | This flag specifies that the memory object is a read-only memory object when used inside a kernel. |
| CL_MEM_USE_HOST_PTR | This flag is valid only if host_ptr is not NULL. If specified, it indicates that the application wants the implementation to use memory referenced by host_ptr as the storage bits for the memory object. Implementations can be allowed to cache the buffer contents pointed to by host_ptr in device memory. This cached copy can be used when kernels are executed on a device. The result of OpenCL commands that operate on multiple buffer objects created with the same host_ptr or overlapping host regions is considered to be undefined. |

TABLE 3-continued

Subbuffer memory creation flags.

| cl_mem_flags | Description |
| --- | --- |
| CL_MEM_ALLOC_HOST_PTR | This flag specifies that the application wants the implementation to allocate memory from host accessible memory. CL_MEM_ALLOC_HOST_PTR and CL_MEM_USE_HOST_PTR are mutually exclusive. |
| CL_MEM_COPY_HOST_PTR | This flag is valid if host_ptr is not NULL. If specified, it indicates that the application wants the implementation to allocate memory for the memory object and copy the data from memory referenced by host_ptr. CL_MEM_COPY_HOST_PTR and CL_MEM_USE_HOST_PTR are mutually exclusive. CL_MEM_COPY_HOST_PTR can be used with CL_MEM_ALLOC_HOST_PTR to initialize the contents of the cl_mem object allocated using host-accessible (e.g. PCIe) memory. |

TABLE 4

CL_BUFFER_CREATE_TYPE Values.

| cl_buffer_create_type | Description |
| --- | --- |
| CL_BUFFER_CREATE_TYPE_REGION | Create a buffer object that represents a specific region in buffer. buffer_create_info is a pointer to the following structure: typedef struct _cl_buffer_region { size_t origin; size_t size; } cl_buffer_region; (origin, size) defines the offset and size in bytes in buffer. If buffer is created with CL_MEM_USE_HOST_PTR, the host_ptr associated with the buffer object returned is host_ptr + origin. The buffer object returned references the data store allocated for buffer and points to a specific region given by (origin, size) in this data store. CL_INVALID_VALUE is returned in errcode_ret if the region specified by (origin, size) is out of bounds in buffer. CL_MISALIGNED_SUB_BUFFER_OFFSET is returned in errcode_ret if there are no devices in context associated with buffer for which the origin value is aligned to the CL_DEVICE_MEM_BASE_ADDR_ALIGN value. |

At block 1004, process 1000 determines if the compute unit for the subbuffer is the same compute unit as the parent buffer. For example and in one embodiment, process 1000 determines that the subbuffer is created for a CPU. If the compute unit is different, process 1000 copies the data to the private memory of the compute unit associated with the subbuffer. For example and in one embodiment, if the compute unit is a GPU and the compute unit associated with the buffer is a CPU, process 1000 would copy the data associated with the subbuffer into the memory of the GPU. Referring back to FIG. 4, process 1000 would copy the data from one of the subbuffers (e.g., subbuffer 410A) into the memory of the GPU (e.g., private memory 404A of compute unit 402A). If the compute units are the same for subbuffer and the buffer, process 1000 uses pointers to access the data in the subbuffer at block 1006. For example and in one embodiment, process 1000 would use pointer 412A to access data in subbuffer 410A as described in FIG. 4 above. Because process 1000 is using pointers to access the data and does not need to update data that is changed, process 1000 ends at 1006.

On the other hand, if process 1000 has copied the data into the private memory of the compute unit associated with the subbuffer, process 1000 tracks updates to the data in the private memory of that compute unit. For example and in one embodiment at block 1010. Based on the tracked updates, process 1000 sends the updates to the parent buffer at block 1012. While in one embodiment, process 1000 sends the updates at once, in alternate embodiment, process 1000 sends the updates in a different fashion (e.g., periodically sends updates, automatically sends updates, etc.).

Figure 11:
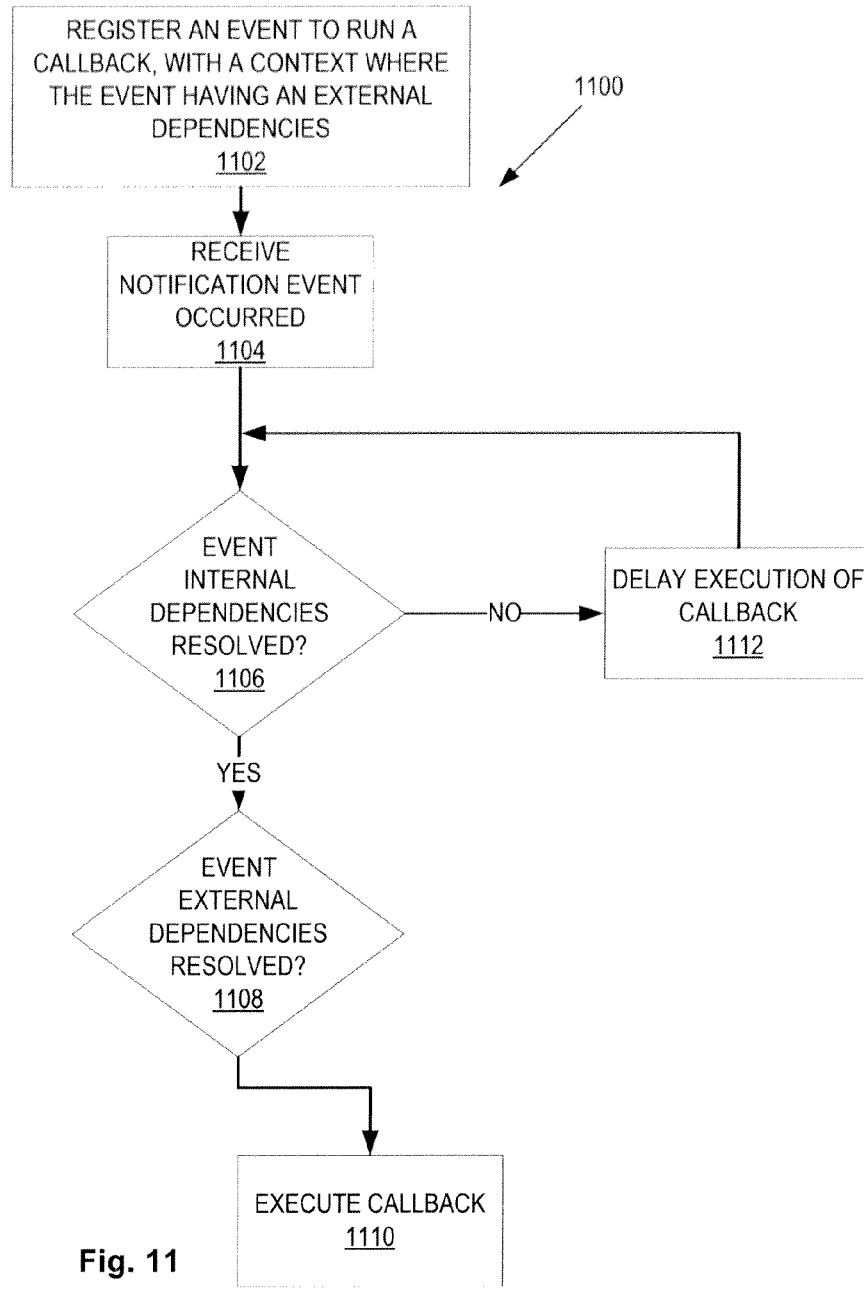
FIG. 11 is a flow diagram illustrating one embodiment of a process to execute callbacks associated with events that have internal and external dependencies.

In addition to creating, using, and/or managing subbuffers for compute units, system 100 can use events to synchronize operations of a context as described above with reference to FIGS. 8 and 9. In one embodiment, an event object encapsulates that status of an operation such as a command. In this embodiment, these objects can be used to synchronize operations in a context. In addition, system 100 can use event wait lists to control when a particular command begins execution. An event wait list is a list of event objects. FIG. 11 is a flow diagram illustrating one embodiment of a process 1100 to execute callbacks associated with events that have internal and external dependencies. In one embodiment, a callback is used to report events (e.g., errors, etc.) that occur within a context. As described above with reference to FIG. 8, a context is created with one or more compute units and is used to manage objects such as command-queues, memory, program, kernel objects and for executing kernels on one or more compute units specified in the context.

Exemplary process 1100 may be performed by a processing logic that may comprise hardware (circuitry, dedicated logic, etc.), software (such as is run on a dedicated machine), or a combination of both. For example, process 1100 may be performed in accordance with the system 100 of FIG. 1 in a data processing system hosted by the hosting systems 101. The data processing system may include a host processor hosting a platform layer, such as compute platform layer 141 of FIG. 1, and multiple physical computing devices attached to the host processor, such as CPUs 117 and GPUs 115 of FIG. 1.

Process 1100 registers an event to run a callback with a context, where the event has external dependencies at block 1102. In one embodiment, an event can have internal, external, and/or no dependencies. An event with an internal dependency means that before the callback associated with the event can be executed, the internal dependency is to be resolved. In one embodiment, the internal dependency is a system recognized event, such as a kernel execution command or managing commands (e.g., read, write, map, copy commands on memory objects). An external dependency is a user defined event and this external dependency should be resolved before the callback can be executed. For example and in one embodiment, a user defined event can allow applications to enqueue commands that wait on the user event to finish before the enqueued command is executed by the corresponding compute unit. In another embodiment, a user event object can be used to report an application specific error condition. In one embodiment, event dependencies can be stored in an event wait list.

At block 1104, process 1100 receives notification that the registered event has occurred. In one embodiment, process 1100 receives notification of the event by invoking a function that waits for events. At block 1106, process 1100 determines if the registered event has any unresolved internal events. For example and in one embodiment, process 1100 determines if an event wait list associated with the registered event has any internal dependencies. If there are any internal dependencies, process 1100 delays execution of the callback at block 1112. In one embodiment, process 1100 delays execution until the internal dependencies are resolved. For example and in one embodiment, resolving a dependency can include waiting for a command associated with a dependent event to complete.

If there are no internal dependency for the registered event, process 1100 determines if the registered event has any external dependencies at block 1108. For example and in one embodiment, process 1100 determines if an event wait list associated with the registered event has any external dependencies. If there are any external dependencies, process 1100 delays execution of the callback at block 1112. In one embodiment, process 1100 delays execution until the external dependencies are resolved. For example and in one embodiment, resolving a dependency can include waiting for a command associated with a dependent event to complete.

Figure 12:
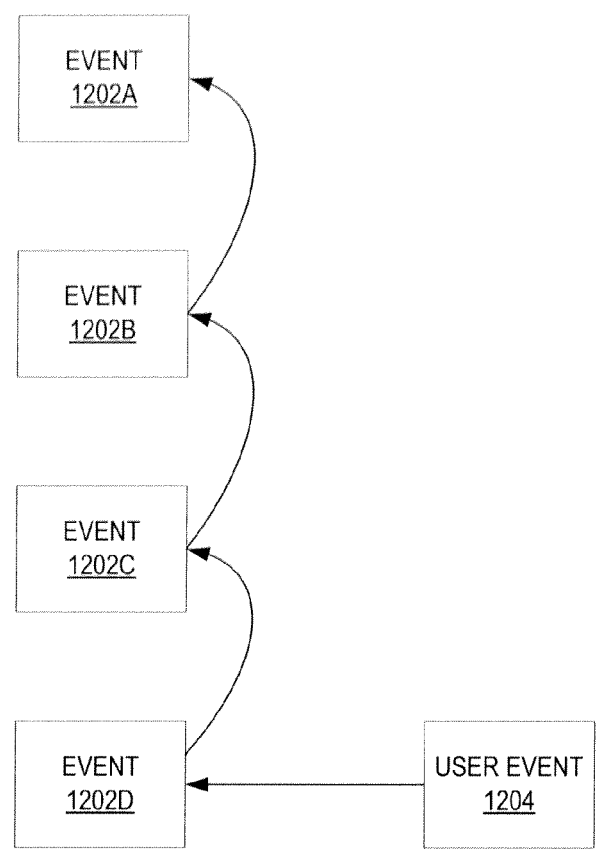
FIG. 12 is a block diagram illustrating one embodiment of a chain of events with internal and external dependencies.

FIG. 12 is a block diagram illustrating one embodiment of a chain of events 1202A-D with internal and external dependencies. In FIG. 12, event 1202A has a chain of dependency including three internal events 1202B-D and an external event, user event 1204. For example and in one embodiment, event 1202A is dependent on event 1202B, which in turn is dependent on event 1202C, which is in turn dependent on event 1202D, which in turn is dependent on user event 1204. In this embodiment, event 1202D waits for user event 1204 to be resolved, event 1202C waits for events 1202D and 1204 to be resolved, event 1202B waits for events 1202C-D and 1204 to be resolved, and event 1202B waits for events 1202B-D and 1204 to be resolved.

FIG. 13 is sample source code illustrating an example of a compute program source code for a compute program executable to be executed in multiple physical computing devices. Example 1300 may represent an API function with arguments including variables 1301 and streams (or compute memory objects) 1303. Example 1300 may be based on a programming language for a parallel computing environment such as system 131 of FIG. 1. In one embodiment, the parallel programming language may be specified according to ANSI (American National Standards Institute) C standard with additional extensions and restrictions designed to implement one or more of the embodiments described herein. The extensions may include a function qualifier, such as qualifier 1305, to specify a compute kernel function to be executed in a computing device. A compute kernel function may not be called by other compute kernel functions. In one embodiment, a compute kernel function may be called by a host function in the parallel program language. A host function may be a regular ANSI C function. A host function may be executed in a host processor separate from the computing device executing a compute kernel function. In one embodiment, the extensions may include a local qualifier to describe variables that need to be allocated in a local memory associated with a computing device to be shared by all threads of a thread group. The local qualifier may be declared inside a compute kernel function. Restrictions of the parallel programming language may be enforced during compiler time or run time to generate error conditions, such as outputting error messages or exiting an execution, when the restrictions are violated.

FIGS. 14A-14C include a sample source code illustrating an example to configure a logical computing device for executing one of multiple executables in multiple physical computing devices by calling APIs. Examples 1400A-1400C may be executed by an application running in a host system attached with multiple physical computing devices, such as hosting systems 101 of FIG. 1. Examples 1400A-1400C may specify a host function of a parallel programming language. Processing operations in examples 1400A-1400C may be performed as API calls by a process such as process 800 of FIG. 8 and/or process 900 of FIG. 9. Processing operations to create a context object from a computing device, a computing device group or a logical computing device 1401 may be performed by the processing logic of process 800 at block 811 of FIG. 8. Processing operations to allocate input/output image memory objects (e.g. compute memory objects) may be performed by the processing logic of process 900 at block 901 of FIG. 9.

Turning now to FIG. 14B, processing operations to allocate and load array memory objects 1403b may be performed by the processing logic of process 900 at block 901 of FIG. 9. The processing operation to create a compute program object 1405 may be performed by the processing logic of process 900 at block 903 of FIG. 9. Processing operation 1407 may load a compute program source, such as example 900 of FIG. 9, to the compute program object created. Processing operation 1409 may explicitly build a compute program executable from the loaded compute program source. In one embodiment, processing operation 1409 may load an already built compute program executable to the created compute program object. Subsequently, processing operation 1411 may create a compute kernel object pointing to the built compute program executable for scheduling an execution on a computing device.

Turing now to FIG. 14C, in one embodiment, processing operation 1413 may attach variables and compute memory objects as function arguments for the created compute kernel object. Processing operation 1413 may be performed by the processing logic of process 900 at block 905 of FIG. 9. Processing operation 1415 may execute the created compute kernel object. In one embodiment, processing operation 1415 may be performed by the processing logic of process 900 at block 911 of FIG. 9. Processing operation 1415 may cause an execution queue to be updated with a compute kernel execution instance corresponding to the created compute kernel object. Processing operation 1417 may synchronously wait for a completion of executing the create compute kernel object. In one embodiment, processing operation 1419 may retrieve a result from executing the compute kernel object. Subsequently, processing operations 1191 may clean up allocated resources for executing the compute kernel object, such as an event object, the created compute kernel object and the allocated memories. In one embodiment, processing operation 1417 may be performed asynchronously based on whether a kernel event object is set. Processing operation 1417 may be performed by process 900 at block 919 of FIG. 9.

Figure 15:
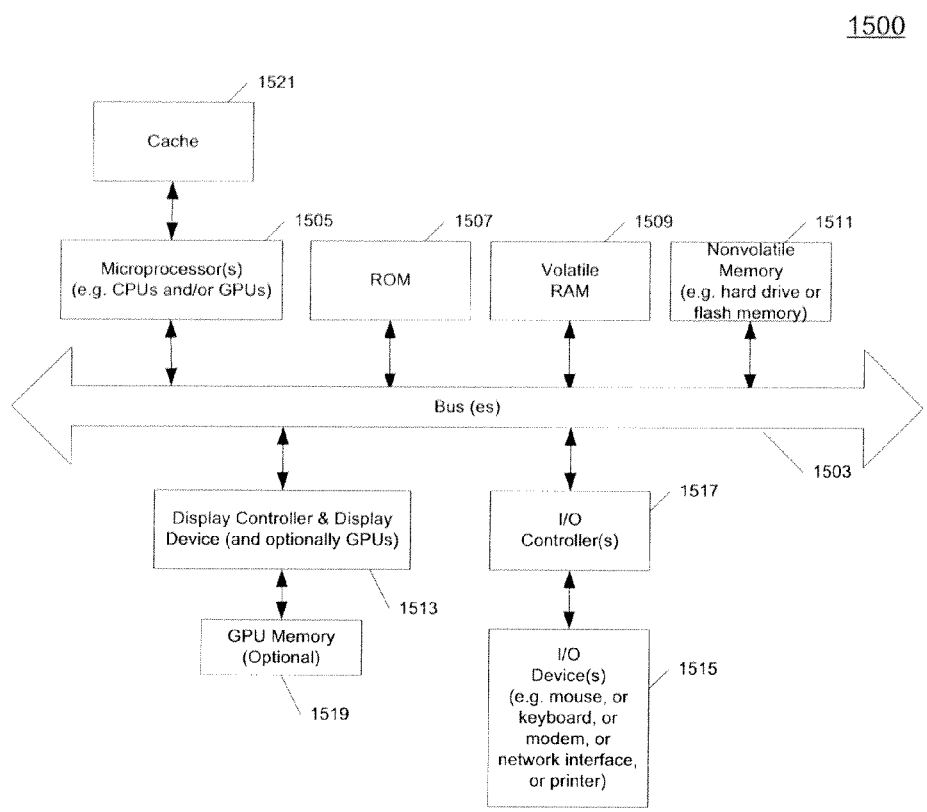
FIG. 15 illustrates one example of a typical computer system with a plurality of CPUs and GPUs (Graphical Processing Unit) that can be used in conjunction with the embodiments described herein.

FIG. 15 shows one example of a computer system 1500 that can be used with one embodiment the present invention. For example, the system 1500 may be implemented as a part of the systems shown in FIG. 1. Note that while FIG. 15 illustrates various components of a computer system, it is not intended to represent any particular architecture or manner of interconnecting the components as such details are not germane to the present invention. It will also be appreciated that network computers and other data processing systems (for example, handheld computers, personal digital assistants (PDAs), cellular telephones, entertainment systems, consumer electronic devices, etc.) which have fewer components or perhaps more components may also be used with to implement one or more embodiments of the present invention.

As shown in FIG. 15, the computer system 1500, which is a form of a data processing system, includes a bus 1503 which is coupled to a microprocessor(s) 1505, such as CPUs and/or GPUs, a ROM (Read Only Memory) 1507, volatile RAM 1509 and a non-volatile memory 1911. The microprocessor 1505 may retrieve the instructions from the memories 1507, 1509, 1911 and execute the instructions using Cache 1521 to perform operations described above. The bus 1503 interconnects these various components together and also interconnects these components 1505, 1507, 1509, and 1911 to a display controller and display device 1913 and to peripheral devices such as input/output (I/O) devices which may be mice, keyboards, modems, network interfaces, printers and other devices which are well known in the art. Typically, the input/output devices 915 are coupled to the system through input/output controllers 1917. The volatile RAM (Random Access Memory) 1509 is typically implemented as dynamic RAM (DRAM) which requires power continually in order to refresh or maintain the data in the memory. The display controller coupled with a display device 1913 may optionally include one or more GPUs to process display data. Optionally, GPU memory 1919 may be provided to support GPUs included in the display device 1913.

The mass storage 1911 is typically a magnetic hard drive or a magnetic optical drive or an optical drive or a DVD RAM or a flash memory or other types of memory systems which maintain data (e.g. large amounts of data) even after power is removed from the system. Typically, the mass storage 1911 will also be a random access memory although this is not required. While FIG. 15 shows that the mass storage 1911 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 1503 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code, for example, including multiple tokens. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., using a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or "copying" or "tracking" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computerized method of managing a plurality of subbuffers associated with a parent buffer in a heterogeneous compute environment, the method comprising:
   allocating the parent buffer for a process, wherein the process uses a plurality of heterogeneous compute units, the plurality of heterogeneous compute units includes a central processing unit and a graphics processing unit, and the plurality of heterogeneous compute units is resident on a single device;
   for each subbuffer in the plurality of subbuffers,
      creating that subbuffer for one of the plurality of heterogeneous compute units from the parent buffer, wherein there is a different subbuffer for each of the plurality of heterogeneous compute units and each of the plurality of subbuffers occupies a different memory region in the parent buffer that was allocated for the process, and
      storing subbuffer data in that subbuffer;
   for each subbuffer that corresponds to one of the plurality of heterogeneous compute units not associated with the parent buffer,
      managing updates to the subbuffer data in a private memory of a corresponding compute unit; and
   for each subbuffer that corresponds to one of the plurality of heterogeneous compute units associated with the parent buffer, accessing the subbuffer data through a pointer to that subbuffer in the parent buffer.

2. The computerized method of claim 1, wherein managing updates to the subbuffer data in the private memory comprises:
   copying the data in that subbuffer to private memory for the compute unit corresponding to that subbuffer;
   tracking updates to the subbuffer data in the private memory for the corresponding compute unit; and
   sending the updates to that buffer.

3. The computerized method of claim 1, further comprising:
   if the compute unit associated with that subbuffer is the same compute unit associated with the parent buffer, creating a pointer to that subbuffer in the buffer.

4. The computerized method of claim 3, wherein the pointer is an offset into the parent buffer.

5. The computerized method of claim 1, wherein the parent buffer is selected from a group consisting of a one-dimensional buffer, a two-dimensional image, and a three-dimensional image.

6. The computerized method of claim 1, wherein the parent buffer is constructed from system memory.

7. The computerized method of claim 1, wherein the parent buffer is an OpenCL buffer.

8. The computerized method of claim 1, wherein the compute unit associated with the parent buffer is a central processing unit and the compute unit not associated with the parent buffer is a graphics processing unit.

9. A non-transitory machine-readable medium having executable instructions to cause one or more processing units to perform a method of managing a plurality of subbuffers associated with a parent buffer in a heterogeneous compute environment, the method comprising:
   allocating the parent buffer for a process, wherein the process uses a plurality of heterogeneous compute units, the plurality of heterogeneous compute units includes a central processing unit and a graphics processing unit, and the plurality of heterogeneous compute units is resident on a single device;
   for each subbuffer in the plurality of subbuffers,
      creating that subbuffer for one of a plurality of heterogeneous compute units from the parent buffer, wherein there is a different subbuffer for each of the plurality of heterogeneous compute units and each of the plurality of subbuffers occupies a different memory region in the parent buffer that was allocated for the process, and storing subbuffer data in the subbuffer; and for each subbuffer that corresponds to one of the plurality of heterogeneous compute units not associated with the parent buffer,
managing updates to the subbuffer data in a private memory of a corresponding compute unit; and for each subbuffer that corresponds to one of the plurality of heterogeneous compute units associated with the parent buffer, accessing the subbuffer data through a pointer to that subbuffer in the parent buffer.

10. The non-transitory machine-readable medium of claim 9, wherein the managing updates to the subbuffer data in the private memory comprises:
copying the data in that subbuffer to private memory for the compute unit corresponding to that subbuffer;
tracking updates to the subbuffer data in the private memory for the corresponding compute unit; and
sending the updates to that buffer.

11. The non-transitory machine-readable medium of claim 9, the method further comprising:
if the compute unit associated with that subbuffer is the same compute unit associated with the parent buffer, creating a pointer to that subbuffer in the parent buffer.

12. The non-transitory machine-readable medium of claim 9, wherein the parent buffer is selected from a group consisting of a one-dimensional buffer, a two-dimensional image, and a three-dimensional image.

13. The non-transitory machine-readable medium of claim 9, wherein the parent buffer is an OpenCL buffer.

14. The non-transitory machine-readable medium of claim 9, wherein the compute unit associated with the parent buffer is a central processing unit and the compute unit not associated with the parent buffer is a graphics processing unit.

15. An apparatus for of managing a plurality of subbuffers associated with a parent buffer of managing a plurality of subbuffers associated with a parent buffer in a heterogeneous compute environment, the apparatus comprising:
means for allocating the parent buffer for a process, wherein the process uses a plurality of heterogeneous compute units, the plurality of heterogeneous compute units includes a central processing unit and a graphics processing unit, and the plurality of heterogeneous compute units is resident on a single device;
for each subbuffer in the plurality of subbuffers,
means for creating that subbuffer for one of a plurality of heterogeneous compute units from the parent buffer, wherein there is a different subbuffer for each of the plurality of heterogeneous compute units and each of the plurality of subbuffers occupies a different memory region in the parent buffer that was allocated for the process, and
means for storing subbuffer data in that subbuffer;
for each subbuffer that corresponds to one of the plurality of heterogeneous compute units not associated with the parent buffer,
means for managing updates to the subbuffer data in a private memory of a corresponding compute unit; and
for each subbuffer that corresponds to one of the plurality of heterogeneous compute units associated with the parent buffer, means for accessing the subbuffer data through a pointer to that subbuffer in the parent buffer.

16. The apparatus of claim 15, wherein the means for managing updates to the subbuffer data in the private memory comprises:
means for copying the data in that subbuffer to private memory for the compute unit corresponding to that subbuffer;
means for tracking updates to data in the private memory for the corresponding compute unit; and
means for sending the updates to that subbuffer.

17. The apparatus of claim 15, further comprising:
if the compute unit associated with that subbuffer is the same compute unit associated with the parent buffer, means for creating a pointer to that subbuffer in the buffer.

18. The apparatus of claim 15, wherein the parent buffer is an OpenCL buffer.

19. The apparatus of claim 15, wherein the compute unit associated with the parent buffer is a central processing unit and the compute unit not associated with the parent buffer is a graphics processing unit.

* * * * *